(12) United States Patent
Moceri et al.

(10) Patent No.: US 10,859,185 B2
(45) Date of Patent: Dec. 8, 2020

(54) PIPE-LAYING VESSEL

(71) Applicant: Saipem S.p.A., Milan (IT)

(72) Inventors: Liborio Moceri, Milan (IT); Valerio Coppi, Milan (IT); Emmanuel Huot, Milan (IT)

(73) Assignee: SAIPEM S.P.A., Milan (IT)

( * ) Notice: Subject to any disclaimer, the term of this patent is extended or adjusted under 35 U.S.C. 154(b) by 0 days.

(21) Appl. No.: 16/324,184

(22) PCT Filed: Aug. 17, 2017

(86) PCT No.: PCT/EP2017/070829
§ 371 (c)(1),
(2) Date: Feb. 8, 2019

(87) PCT Pub. No.: WO2018/033592
PCT Pub. Date: Feb. 22, 2018

(65) Prior Publication Data
US 2019/0211945 A1 Jul. 11, 2019

(30) Foreign Application Priority Data
Aug. 18, 2016 (GB) .................................. 1614127.7

(51) Int. Cl.
*F16L 1/19* (2006.01)
*F16L 1/235* (2006.01)
*F16L 1/20* (2006.01)

(52) U.S. Cl.
CPC .................. *F16L 1/19* (2013.01); *F16L 1/205* (2013.01); *F16L 1/206* (2013.01); *F16L 1/207* (2013.01)

(58) Field of Classification Search
CPC . F16L 1/205; F16L 1/206; F16L 1/207; F16L 1/23

(Continued)

(56) References Cited

U.S. PATENT DOCUMENTS

| 6,524,030 B1 | 2/2003 | Giovannini et al. |
| 6,554,538 B2 * | 4/2003 | Stockstill ............... B63B 35/03 405/168.3 |

(Continued)

FOREIGN PATENT DOCUMENTS

| GB | 2 469 519 A | 10/2010 |
| WO | 03/004915 A1 | 1/2003 |

(Continued)

OTHER PUBLICATIONS

International Search Report (PCT/ISA/210) dated Jan. 22, 2018, by the European Patent Office as the International Searching Authority for International Application No. PCT/EP2017/070829.

(Continued)

*Primary Examiner* — Frederick L Lagman
(74) *Attorney, Agent, or Firm* — Buchanan Ingersoll & Rooney PC

(57) ABSTRACT

The disclosure provides a pipe-laying vessel including a pipe-laying tower extending upwardly from the vessel, and the vessel includes at least three separate workstations spaced apart along the length of the tower. The disclosure also provides a pipe-laying vessel including a pipe-laying tower extending upwardly from the vessel, and the vessel includes at least two clamping assemblies for clamping a pipeline, the clamping assemblies being mounted along the length of the tower, and at least one workstation mounted on the tower. The workstation is mounted on the tower below a lowermost clamping assembly. The disclosure also provides a method of J-laying pipeline from a vessel, a method of abandoning a product from a vessel, and a method of recovering a previously abandoned product to a vessel.

29 Claims, 18 Drawing Sheets

(58) Field of Classification Search
USPC .............................................. 405/166, 168.4
See application file for complete search history.

(56) References Cited

U.S. PATENT DOCUMENTS

| | | | |
|---|---|---|---|
| 6,588,981 B2* | 7/2003 | Willis .................... | F16L 1/19 405/168.1 |
| 6,702,519 B2* | 3/2004 | Stockstill .............. | B63B 35/03 405/166 |
| 6,733,208 B2* | 5/2004 | Stockstill .............. | B63B 35/03 405/166 |
| 7,029,206 B2* | 4/2006 | Stockstill .............. | B63B 35/03 405/168.3 |
| 7,581,904 B2* | 9/2009 | Bursaux ................ | B63B 35/03 405/166 |
| 8,142,107 B2* | 3/2012 | Roodenburg ......... | F16L 1/19 405/166 |
| 8,251,613 B2* | 8/2012 | Narold .................. | F16L 1/19 405/166 |
| 2003/0044234 A1 | 3/2003 | Stockstill | |
| 2008/0292405 A1* | 11/2008 | Roodenburg ......... | F16L 1/19 405/166 |
| 2010/0111612 A1 | 5/2010 | Narold et al. | |
| 2010/0232884 A1 | 9/2010 | Roodenburg et al. | |
| 2011/0123273 A1 | 5/2011 | Feijen et al. | |
| 2011/0236137 A1 | 9/2011 | Legaignoux et al. | |
| 2013/0279989 A1 | 10/2013 | Baylot et al. | |
| 2013/0294838 A1 | 11/2013 | Bianchi et al. | |
| 2013/0315674 A1* | 11/2013 | Roodenburg ......... | E21B 19/155 405/168.4 |
| 2014/0241808 A1 | 8/2014 | Huot et al. | |

FOREIGN PATENT DOCUMENTS

| | | |
|---|---|---|
| WO | 2007/108673 A1 | 9/2007 |
| WO | 2008/120977 A1 | 10/2008 |
| WO | 2009/134116 A1 | 11/2009 |
| WO | 2009/153352 A2 | 12/2009 |
| WO | 2010/107319 A1 | 9/2010 |
| WO | 2012091556 A1 | 7/2012 |
| WO | 2012/101232 A2 | 8/2012 |
| WO | 2012/101233 A2 | 8/2012 |
| WO | 2012/114318 A1 | 8/2012 |

OTHER PUBLICATIONS

Written Opinion (PCT/ISA/237) dated Jan. 22, 2018, by the European Patent Office as the International Searching Authority for International Application No. PCT/EP2017/070829.

Office Action (Communication) dated Jul. 2, 2020, by the European Patent Office in corresponding European Patent Application No. 17752396.6. (11 pages).

* cited by examiner

PIPE-LAYING VESSEL

BACKGROUND OF THE INVENTION

The present disclosure relates to a pipe-laying vessel.

The present invention concerns a pipe-laying vessel including a pipe-laying tower extending upwardly from the vessel, for example a J-laying vessel, which includes a J-lay tower. The present invention also concerns a method of J-laying pipeline or other elongate product and/or also concerns a J-lay tower.

J-laying vessels are well known. Many known vessels (such as disclosed in U.S. Pat. No. 6,524,030B1, WO 2009/153352, WO 2012/101232 and WO 2012/101233) have features such as tiltable towers, bulky item installation systems, a number of workstations along the tower, pipestring clamps with line-up capabilities and foldable towers (for stowage).

However, none of these prior art vessels is capable of laying in J-lay configuration both rigid pipeline and a flexible conduit simultaneously with the flexible conduit being coupled to the rigid pipeline (in a manner referred to in the art as "piggy back" pipelaying). In addition, it is not readily possible to handle bulky items in situations where the angle of the tower (to the horizontal) is relatively low.

The present invention seeks to mitigate one or more of the above-mentioned problems. Alternatively or additionally, the present invention seeks to provide an improved pipe-laying vessel and/or pipe-laying tower therefor.

SUMMARY OF THE INVENTION

The present invention provides, according to a first aspect, a pipe-laying vessel including a pipe-laying tower extending upwardly from the vessel, the vessel comprising at least three separate workstations spaced apart along the length of the tower. The tower may thus be configured to be able to lay in J-lay mode, and may thus be referred to as a J-lay tower. It will be appreciated that in cases where the tower is tiltable, it may also be possible for the tower to lay in other modes, such as S-lay.

A workstation, in the context of the different aspects of the invention, means a station at which the pipeline being formed can be processed in some way. It may be that one or more, or possibly all, of the workstations are manned when operational, or at least configured to allow personnel access. It may be that at least one of the workstations is configured for fully-automated processing of product (rigid or flexible pipe, for example) for at least some of the time when operational. At least one of the workstations may be configured for welding pipeline, for example joining sections of pipe. There may for example be a welding workstation which enables a pipestring above it to be welded to a pipestring below it, which, by then, may be regarded as the upper end of the pipeline. At least one of the workstations may be configured for performing coating operations. There may for example be a coating workstation which enables a pipestring joint or pipeline joint to be coated as it passes through the coating station. At least one of the workstations may be configured for performing inspecting/testing operations. At least one of the workstations may be configured for performing repairing and/or cutting operations. At least one of the workstations may be configured for connecting of a flexible conduit to the pipeline being laid. One or more of the workstations may be configured for performing two or more of the afore-mentioned processes. For example, a workstation may be configured to carry out non-destructive tests (NDT) on the pipestring or pipeline and, if necessary, repair or replace any defective welds, including for example cutting and re-welding (at least partially) defective welds.

Having three workstations enables each workstation to perform a different set of functions. For example, an uppermost workstation may be used for welding, NDT testing and repair (including for example cutting and then re-welding), a middle workstation may be used for coating and also for welding of bulky items, and a lowermost workstation may be used for connecting a flexible conduit to the pipeline being laid (for example in piggy-back configuration). In addition, these workstations may be used in parallel; for example one workstation can be used for coating and another can be used simultaneously for connecting a flexible conduit. This may reduce the time taken by the workstations as a whole and so speed up the laying process. The present invention has particular, but not exclusive, application in relation to the laying of rigid pipeline in J-lay configuration with flexible product piggy-backed onto the rigid pipeline.

The J-lay tower may be designed to be a relatively low height so as to take only double, rather than triple or quadruple, pipestring joints. Such double pipestring joints may have a length of between 18 m and 30 m, typically between 20 m and 28 m, for example 24m. This enables the tower to be lighter and shorter, and may enable smaller vessels to be fitted with a smaller lighter tower, which with the provision of three workstations, still offers a commercially viable laying speed. The centres of gravity of at least one pair of adjacent workstations may be separated by a distance of less than 30 m, possibly less than 26 m. The centres of gravity of the uppermost workstation and the lowermost workstation may be separated by a distance of less than 60 m, possibly about 50 m or less.

Preferably, the vessel includes a plurality of clamping assemblies for clamping a pipeline, the clamping assemblies being mounted along the length of the tower and wherein a lowermost workstation is mounted on the tower below a lowermost clamping assembly. This enables the lowermost workstation (which may be used for connecting a flexible conduit to the pipeline being laid, using saddles for example) to be below a final clamping assembly (for example, below a hang-off clamp). This means that any flexible conduit being connected to the rigid pipeline by the lowermost workstation is not clamped or secured by any of the clamping assemblies on the tower and so there is less chance of such clamping assemblies interfering with and/or damaging the flexible conduit (flexible conduit being more prone to clamping damage, by a friction clamp or tensioners, for example, than rigid pipeline). It may be that the tower is so arranged that rigid pipeline is laid along a first firing path and flexible conduit is laid along a second firing path, the first and second firing paths being offset from each other, for example for substantially the entire length of the paths upstream of the lowermost clamping assembly on the tower.

More preferably, the lowermost workstation is configured to attach a flexible conduit alongside the pipeline. In the context of the different aspects of the invention, the flexible conduit may be a flexible umbilical, flexible pipe, cables or any other kind of flexible product including bundles of flexible products. For example, it may be a heating cable, a power cable or a fibre optic cable. The flexible conduit may have a diameter of greater than 20 mm, possibly greater than 30 mm. The flexible conduit may have a diameter of less than 250 mm. The vessel and/or tower may be configured to be able to handle flexible conduit having any diameter within the range of 25 mm to 250 mm, and also possibly other sizes. Preferably, the lowermost clamping assembly is at or above deck level of the vessel. This provides more room for the lowermost workstation below the lowermost clamping assembly. In the context of the different aspects of the invention, the deck of the vessel refers to a lowermost, main deck level of the vessel.

Preferably, the lowermost clamping assembly comprises a hang-off clamp. The hang-off clamp may comprise a friction clamp. The hang-off clamp may comprise a collar clamp. The hang-off clamp may comprise both a friction clamp and a collar clamp. The lowermost clamping assembly may have a working capacity of at least 150 tonnes, possibly 300 tonnes or more.

Preferably, the vessel includes a plurality of clamping assemblies for clamping a pipeline, the clamping assemblies being mounted along the length of the tower and wherein an uppermost workstation is mounted on the tower above an uppermost clamping assembly. In the context of the different aspects of the invention, uppermost clamping assembly means the uppermost clamping assembly out of the clamping assemblies in or on the tower that have a controllable lateral position with respect to the tower. For example, this does not include an internal line up clamp on a winch or an abandonment/recovery apparatus on a sheave. However, it does include a travelling clamp assembly that moves up and down the tower at a controlled lateral position with respect to the tower. Further, the uppermost clamping assembly means the uppermost clamping assembly out of the clamping assemblies that have a capacity to clamp the pipeline. This does not include clamps simply arranged to clamp a pipestring, and not the whole pipeline being laid. This enables the uppermost workstation to be used for welding a pipestring to the pipeline above the first clamping assembly (i.e. above the clamping assembly clamping the pipeline). The term clamping is intended to cover holding or gripping of pipeline under tension. A pipeline may for example be clamped under tension without necessarily requiring physical contact between whatever apparatus forms the clamping assembly and the entire outer circumference around the pipe in the region of clamping. The term clamping assembly is not intended to cover rollers or other means for merely guiding the lateral position of the pipeline/product, without also holding the tension.

More preferably, the uppermost workstation is a welding station configured to weld a lower end of a pipestring to an upper end of the pipeline.

It may be that the uppermost clamping assembly comprises a pipeline tensioner arrangement. The uppermost clamping assembly may comprise a friction clamp. The uppermost clamping assembly may comprise a collar clamp. The uppermost clamping assembly may have a working capacity of at least 150 tonnes, possibly 300 tonnes or more.

Preferably, the vessel includes at least two clamping assemblies for clamping a pipeline, the at least two clamping assemblies being mounted along the length of the tower and wherein an intermediate workstation is mounted on the tower in between the two clamping assemblies. This enables the intermediate workstation to be used to coat the pipestring/pipeline and also to be used to weld bulky items to the pipeline.

More preferably, the intermediate workstation is a coating station configured to coat the pipeline.

The tower of the vessel may be configured as (or at least configurable as) a J-lay tower. The tower may be tiltable. The tower may be arranged to be tilted at any angle in the range of 55 degrees to 90 degrees to the horizontal. It may be that the tower is configured to perform laying of rigid pipeline at any angle in the range of 55 degrees to 90 degrees to the horizontal. It may be that the tower is arranged to be tilted at any angle in the range of 35 degrees to 90 degrees to the horizontal. It may be that the tower is additionally arranged to be tilted beyond the vertical, for example up to an angle of 95 degrees. In the case where the tower is tiltable it may be that at least one of, and preferably all of the workstations mounted on the tower, are also tiltable, for example so that the workstation can remain in the same orientation relative to the deck of the vessel irrespective of the tilt angle of the tower. The tower may be arranged in sections, there being an upper section (the upper section having a height more than 20%, but less than 80% of the full height of the tower above deck level, and preferably having a height greater than 30% and preferably less than 70% of the full height of the tower above deck level) that is configured to fold down so as to reduce the full height of the tower on deck. The upper section may be arranged to rotate relative to the rest of the tower by more than 80 degrees, possibly more than 120 degrees. The tower may have a modular construction, for example so that it may be broken down into multiple separate parts being relatively low in number and/or be readily assembled from such separate parts.

It may be that the tower comprises two (or more) sub-towers one of which folds down to lie substantially along the length of the other so as to form a compact configuration suitable for transit. There may be one or more demountable sub-towers. The tower may be associated with a stinger. The stinger may also be configured to be folded away or removed for transit.

According to a second aspect of the invention there is also provided a pipe-laying vessel including a pipe-laying tower extending upwardly from the vessel, the vessel comprising at least two clamping assemblies for clamping a pipeline, the clamping assemblies being mounted along the length of the tower, and at least one workstation mounted on the tower, wherein the workstation is mounted on the tower below a lowermost clamping assembly.

Having a workstation mounted below the lowermost clamp assembly enables the workstation (which may be used for connecting a flexible conduit to the pipeline being laid, using saddles for example) to be below a final clamping assembly (for example, below a hang-off clamp). This means that any flexible conduit being connected to the rigid pipeline by the lowermost workstation is, during operation, not clamped by any of the clamping assemblies on the tower and so is not damaged by them. A lowermost clamping assembly, in the context of the different aspects of the invention, may be "lowermost" in the sense that there is no other clamping assembly, as defined above, below the lowermost clamping assembly. In particular, there is no other clamping assembly, which is mounted at a position along the length of the tower that is lower than the "lowermost clamping assembly", and which is also provided for the purpose holding the full weight of the pipeline being laid.

Preferably, the lowermost clamping assembly is at or above deck level of the vessel. This provides more room for the workstation below the lowermost clamping assembly.

Preferably, the lowermost clamping assembly comprises a hang-off clamp, for example as described above in relation to the first aspect of the invention. Preferably, the workstation is configured to attach a flexible conduit alongside the pipeline. This enables the workstation to be below a final clamping assembly (for example, below a hang-off clamp).

Preferably, the vessel includes a plurality of clamping assemblies for clamping a pipeline, the clamping assemblies being mounted along the length of the tower and wherein an uppermost workstation is mounted on the tower above an uppermost clamping assembly. This enables the uppermost workstation to be used for welding a pipestring to the pipeline above the first clamping assembly (i.e. above the clamping assembly clamping the pipeline).

More preferably, the uppermost workstation is a welding station configured to weld a lower end of a pipestring to an upper end of the pipeline.

Preferably, the uppermost clamping assembly comprises a pipeline clamp or tensioner arrangement.

Preferably, the vessel includes at least two clamping assemblies for clamping a pipeline, the at least two clamping assemblies being mounted along the length of the tower and wherein an intermediate workstation is mounted on the tower in between the two clamping assemblies. This enables the intermediate workstation to be used to coat the pipestring/pipeline and also to be used to weld bulky items to the pipeline.

More preferably, the intermediate workstation is a coating station configured to coat the pipeline.

According to a third aspect of the invention there is also provided a method of f-laying pipeline from a vessel, the method including the steps of passing a rigid pipeline down a length of a J-lay tower on the vessel, and attaching a flexible conduit alongside the pipeline, wherein the J-lay tower includes a workstation at which the flexible conduit is attached to the rigid pipeline.

This enables the flexible conduit to be connected to the pipeline, for example by saddles, and laid simultaneously with the pipeline in J-laying (e.g. facilitating piggy-back pipelaying operations in J-lay mode).

The workstation at which the flexible conduit is attached to the rigid pipeline may be the lowermost workstation of the J-lay tower. Preferably, the vessel comprises a plurality of clamping assemblies, the clamping assemblies being mounted along the length of the tower such that there is a lowermost clamping assembly and wherein the workstation (i.e. the workstation at which the flexible conduit is attached to the rigid pipeline) is mounted on the tower below the lowermost clamping assembly.

Preferably, the lowermost clamping assembly is at or above deck level of the vessel. This provides more room for the workstation for connecting the flexible conduit, below the lowermost clamping assembly.

Preferably, the lowermost clamping assembly comprises a hang-off clamp, for example as described above in relation to the first aspect of the invention.

Preferably, the vessel includes a plurality of clamping assemblies for clamping a pipeline, the clamping assemblies being mounted along the length of the tower and wherein an uppermost workstation is mounted on the tower above an uppermost clamping assembly. This enables the uppermost workstation to be used for welding a pipestring to the pipeline above the first clamping assembly (i.e. above the clamping assembly clamping the pipeline).

More preferably, the uppermost workstation is a welding station configured to weld a lower end of a pipestring to an upper end of the pipeline.

The uppermost clamping assembly may comprise a pipeline clamp, tensioner arrangement, or the like, for example as described above in relation to the first aspect of the invention.

Preferably, the vessel includes at least two clamping assemblies for clamping a pipeline, the at least two clamping assemblies being mounted along the length of the tower and wherein an intermediate workstation is mounted on the tower in between the two clamping assemblies. This enables the intermediate workstation to be used to coat the pipestring/pipeline and also to be used to weld bulky items to the pipeline.

More preferably, the intermediate workstation is a coating station configured to coat a joint of the pipeline.

According to a fourth aspect of the invention there is also provided a method of abandoning a product from a vessel, the product comprising a rigid pipeline with attached flexible conduit. Such a method comprises a step of passing the rigid pipeline along a first firing path, using a first apparatus. There is a step of passing the flexible conduit along a second, separate firing path, using a second, separate apparatus. The method further comprises a step of abandoning the rigid pipeline by breaking a direct connection between the rigid pipeline and the vessel, and retaining a direct connection of the vessel with the flexible conduit, such that the flexible conduit can continue to be passed along the second firing path whilst the rigid pipeline is abandoned.

This method, which can be used with J-laying or other modes of laying for example, enables the rigid pipeline to be abandoned, when required, whilst retaining a laying connection with the flexible conduit. This is achieved partly by the fact that the flexible conduit and rigid pipeline are laid through two separate firing paths. In addition, it is also possible because the flexible conduit is laid from a location lower than the abandonment apparatus, e.g. an abandonment/recovery winch system, used to abandon the rigid pipeline. The flexible conduit may be laid from a reel on the vessel. In certain embodiments, the vessel may be used to lay "rigid" pipeline from a reel, with such laying operations for example requiring pipe bending apparatus.

Advantageously, the step of abandoning the rigid pipeline includes using an abandonment/recovery winch system, separate from the first and second apparatus.

According to a fifth aspect of the invention there is also provided a method of recovering a previously abandoned product to a vessel, the product comprising a rigid pipeline with attached flexible conduit. The method comprises a step of paying-in the flexible conduit, while (a) the rigid pipeline remains disconnected directly from the vessel (b) there is retained a direct connection between the vessel and the flexible conduit, and (c) the rigid pipeline is attached to the flexible conduit. The method may also include a step of recovering a free end of the rigid pipeline onto the vessel, for example while still connected to the flexible conduit.

This method, which can be used in J-laying or other modes of operation, enables the rigid pipeline to be recovered, while maintaining the retained connection with the flexible conduit. This may, in certain embodiments of the invention, be achieved partly by arranging the flexible conduit and rigid pipeline to be laid through two separate firing paths. In addition, it may also be that the flexible conduit is laid from a location lower than the abandonment apparatus, e.g. an abandonment/recovery winch system, used to abandon the rigid pipeline.

Once recovered, the free end of the recovered rigid pipeline can be joined to a free end of a rigid pipeline product, such as a length of rigid pipestring for example. Pipelaying operations can then be recommenced.

According to a sixth aspect of the invention there is also provided a pipe-laying vessel including a pipe-laying tower extending upwardly from the vessel, wherein the tower is tiltable and provided with an internal pipe clamp apparatus, the internal pipe clamp apparatus comprising an internal pipe clamp, a housing garage for the internal pipe clamp and a guide apparatus for guiding the internal pipe clamp from the garage to an end of a pipeline held by the tower.

The internal pipe clamp may be suspended by a line, such as a winch line, such that if the internal pipe clamp's orientation were not controlled or otherwise constrained by its garage, the guide apparatus or the pipe, it would tend to adopt a vertical orientation by virtue of gravity. Having the guide apparatus allows the internal pipe clamp to be guided from the garage to a pipeline end at a required orientation (aligned with the orientation of the pipeline end) so that it can be inserted into the pipeline end at that orientation. This aids with the insertion of the internal pipe clamp (as it is already held at the correct angle/orientation) and makes operation smoother.

It may be that the housing garage is arranged to tilt with the tower, so that the housing garage follows the tilting movement of the tower. It may be that the housing garage is mounted on the tower so as to move with the tower. It may be that the housing garage is mounted so that the tower may move independently of the housing garage.

It may be that the guide apparatus is arranged to tilt with the tower so that its orientation is substantially the same as the tower, and for example the pipeline held by the tower. It may be that the guide apparatus is mounted on the tower so as to move with the tower. It may be that the guide apparatus is mounted so as to be able to move independently of the tower. It may be that the guide apparatus is arranged to guide the internal pipe clamp at an orientation that depends on the orientation of the tiltable tower (e.g. it may be that the guide apparatus is arranged to guide the internal pipe clamp at an orientation that is the same as the orientation of the tiltable tower). This means that the internal pipe clamp is automatically held at the correct orientation for any given tower orientation.

The guide apparatus may comprise a trolley arranged to transport the internal pipe clamp apparatus between a stored position in the housing garage and a pipe-clamping position outside of the housing garage, preferably a position next to the end of the pipeline held by the tower. The trolley is preferably so configured that the orientation of the internal pipe clamp apparatus when in its pipe-clamping position corresponds to the orientation of the pipeline. The guide apparatus may comprise a rail for guiding the internal pipe clamp apparatus between a stored position and a pipe-clamping position. The rail is preferably so configured that the orientation of the internal pipe clamp apparatus when in its pipe-clamping position corresponds to the orientation of the pipeline. It may be that both such a trolley and such a rail are provided, with the internal pipe clamp apparatus being carried by a trolley that is guided by the rail. The internal pipe clamp apparatus is preferably releasably coupled to the trolley/rail.

The present invention also provides a tower, for example a J-lay tower, that is arranged for use in any of the aspects of the invention as described or claimed herein, possibly including any optional features described with reference thereto. The tower may be supplied separately from the vessel. The tower may be supplied as a kit of parts. The tower may comprise two, three or four sub-towers, which are arranged to be assembled together to form the full tower. The tower may comprise one or more workstations. It may be that one or more workstations are provided separately from the tower, but that the tower is configured to accommodate such workstations. The tower may include a main attachment point defined by load-bearing structure of the tower, the attachment point facilitating mounting of the tower to a vessel. There may be more than one main attachment point. The tower may include a tilting arm (or two or more such arms) so that the tower may be tilted relative to the vessel. The tilting arm may be rotatable connected to the vessel. The tilting arm may have a variable length. The tilting arm may comprise two or more telescopic parts that enable the arm to vary its length. The tilting arm may include a main attachment point defined by load-bearing structure that is arranged for attaching to the vessel. The tower may be provided with a stinger section.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
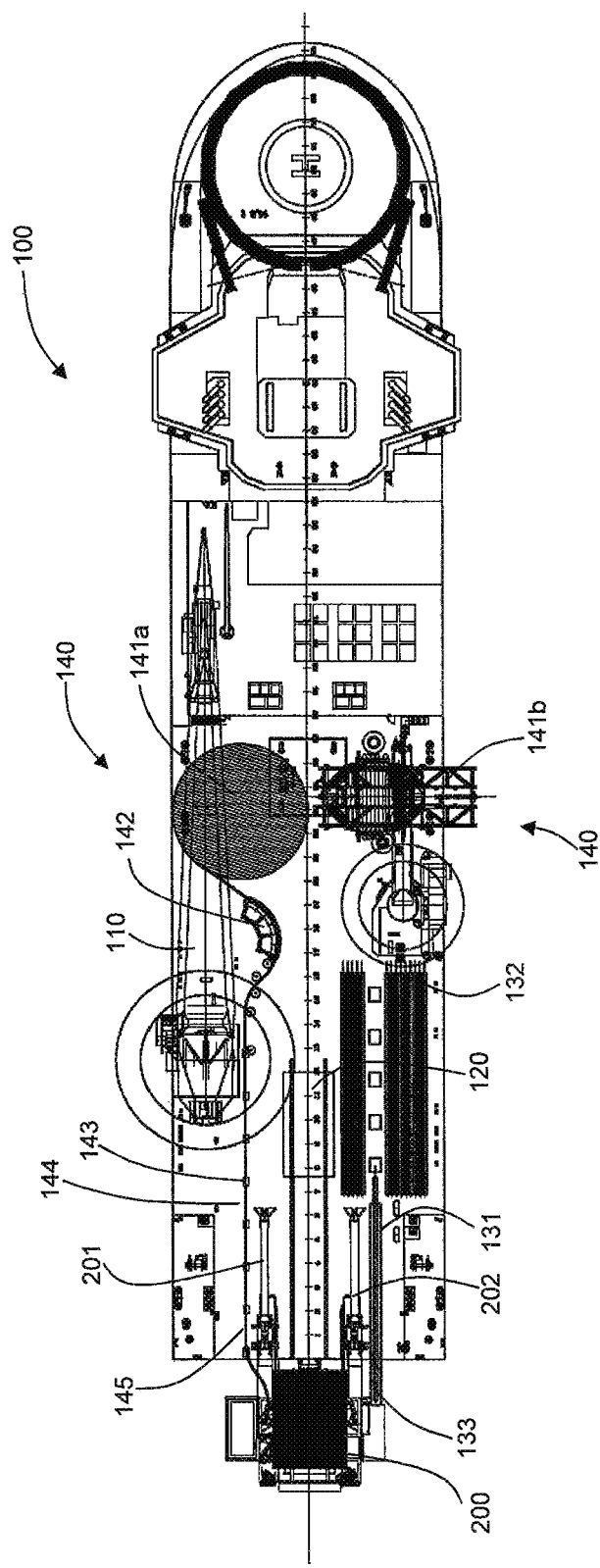
FIGS. 1a to 1c show plan views of a vessel according to a first embodiment of the invention.
Figure 1B:
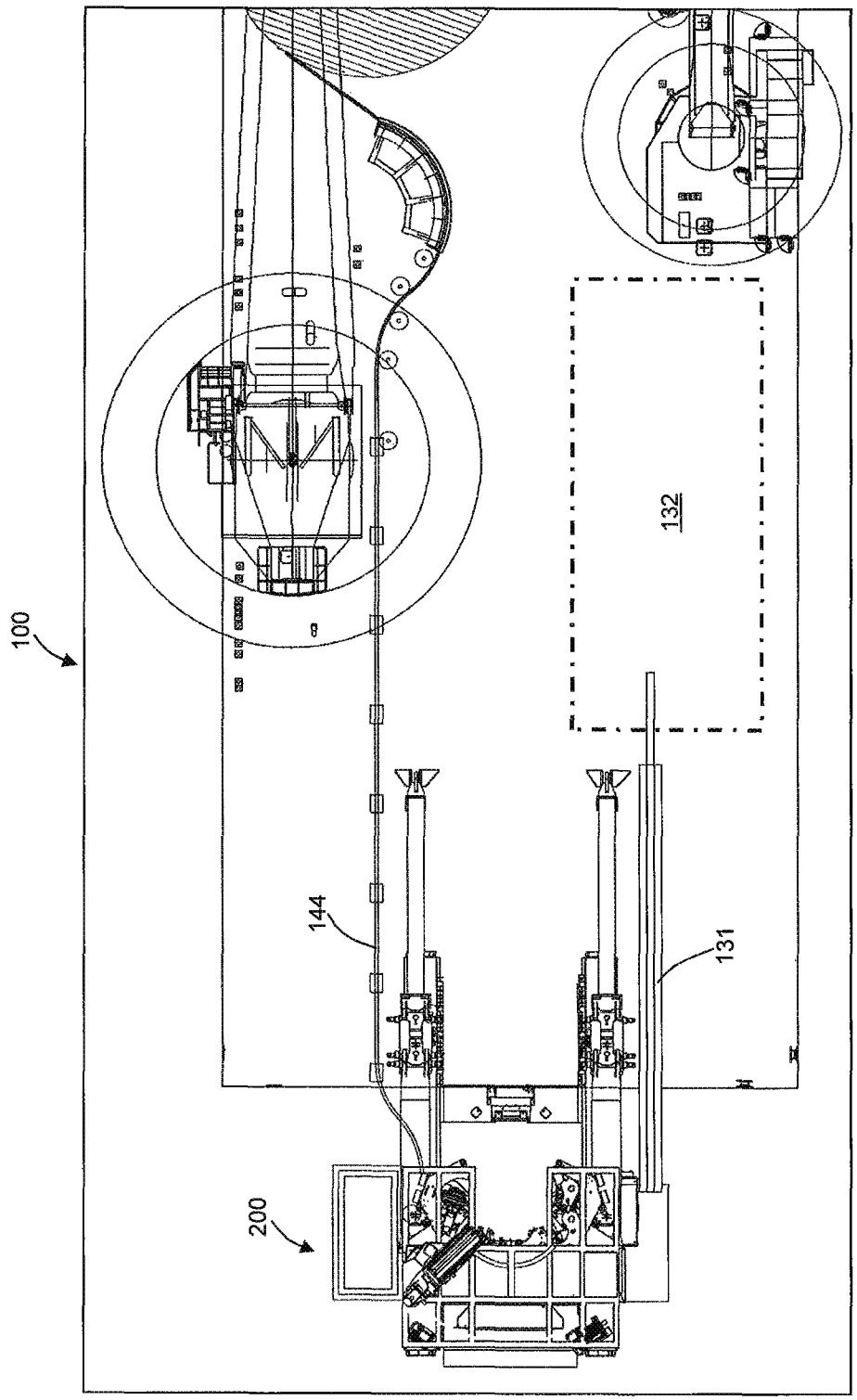
Figure 1C:
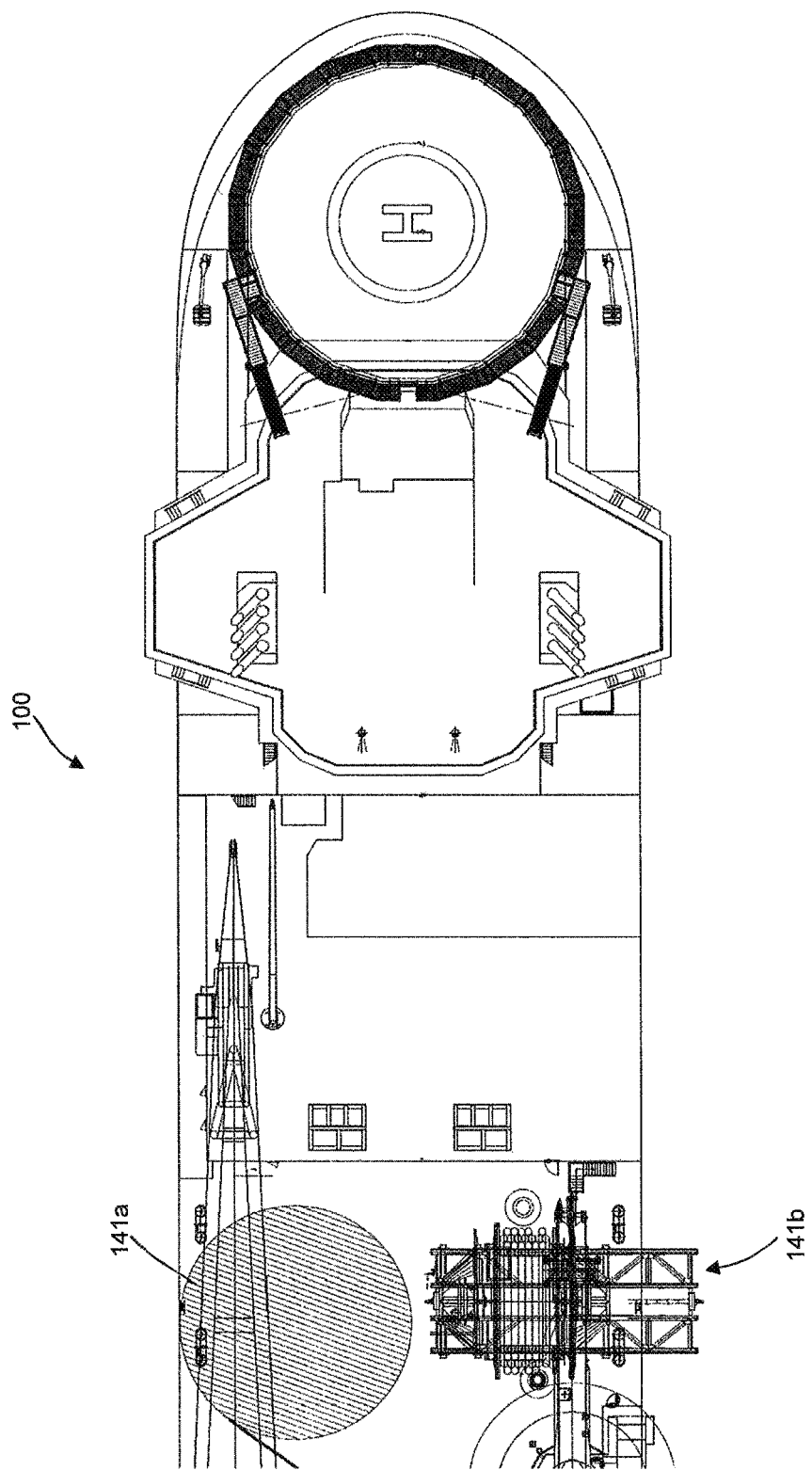
Figure 2:
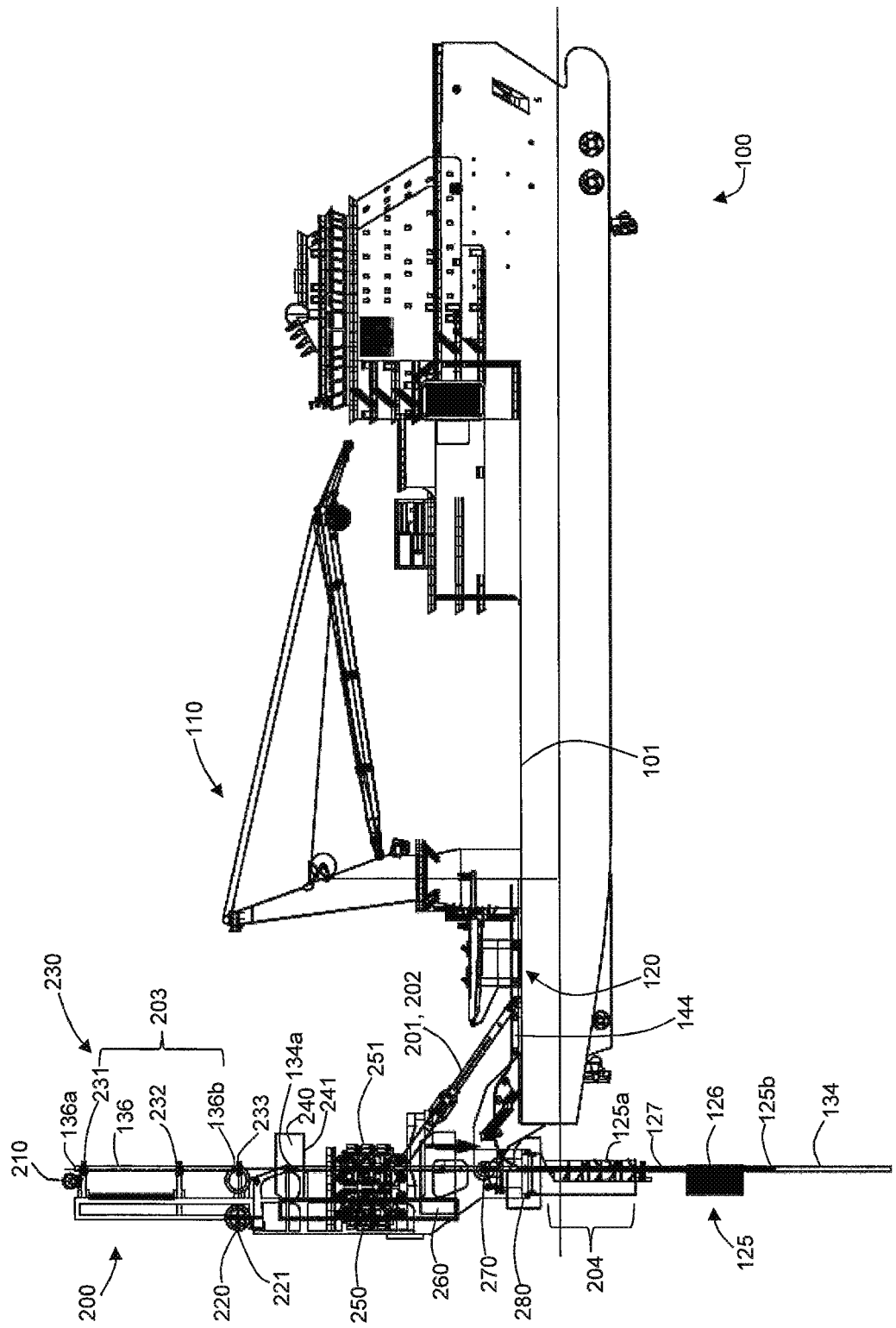
FIG. 2 shows a side view of the vessel of FIG. 1, during normal deployment of a pipeline.

FIG. 1a shows a plan view, and FIG. 2 shows a side view, of a vessel 100 according to a first embodiment of the invention. FIGS. 1b and 1c show the stern and bow, respectively, of the vessel in plan view with certain parts shown in FIG. 1a being omitted or made more schematic for the sake of clarity. The vessel has a main deck 101. Various equipment is situated on the deck 101, including a crane 110 on the portside of the vessel and a bulky item handling skid 120 (omitted from FIG. 1b) next to the crane 110 and in the region of the centreline of the vessel and towards the stern.

The vessel 100 is provided with a J-lay tower 200 at the stern of the vessel. The tower 200 is supported on the vessel by two supports 201, 202, one of either side of the tower. The tower 200 acts to lay rigid pipeline 134 along a first firing line 133.

There is also provided flexible product handling equipment, designated generally by 140, on the vessel deck 101. This equipment 140 comprises a basket 141a and reel 141b for holding the flexible product 144, a curvature controller 142 to provide a suitably large enough bend in the product when being taken off the basket/reel 141a/141b, and rollers 143 for supporting the flexible product and enabling it to smoothly be pulled out. The flexible product 144 is laid along a second firing line 145.

There is also provided a pipestring stock 132 (shown schematically only in FIG. 1*b*) and a loading arm 131 for raising individual pipestrings 136 from the stock to a position parallel to the tower 200 and then to raise the pipestring up and in the tower.

Looking in more detail at the tower 200, and with reference to FIG. 2 in particular, the tower has a top truss section 203 and a lower stinger 204. Although not shown, both the truss section 203 and the stinger 204 can be folded back against a main central portion of the tower 200, for transit. The truss section 203 is folded anti-clockwise (when looking at the vessel from the starboard side, as shown in FIG. 2) to rest against the stern side of the tower 200. The stinger is folded clockwise to rest against the stern side of the tower 200. The tower 200 itself is tiltable about its connection at the stern of the vessel. It is tiltable from the 90 degrees angle shown, in FIGS. 2 to 3*g*, to an angle of 55 degrees to the horizontal/vessel deck 101, for the purposes of laying operations and further tiltable to an angle of 35 degrees to the horizontal/vessel deck 101 for the purpose of assisting transit. It is also tiltable backwards from the position shown to an angle of 96 degrees. (An example of the tilting of the tower is shown and briefly described below with reference to FIGS. 4*d* to 4*f*).

The tower 200 is designed to join together double pipestring joints at a time. In other words, each time a pipestring 136 is welded to a pipeline 134 being laid, the pipestring 136 is one of a double joint length (24 m). Therefore, the length of the truss section 203 corresponds to this height (as a minimum). In FIG. 2, a pipestring 136 can be seen with its upper end 136*a* at the top of the truss section 203 and its lower end 136*b* at the bottom of the truss section.

Figure 3A:
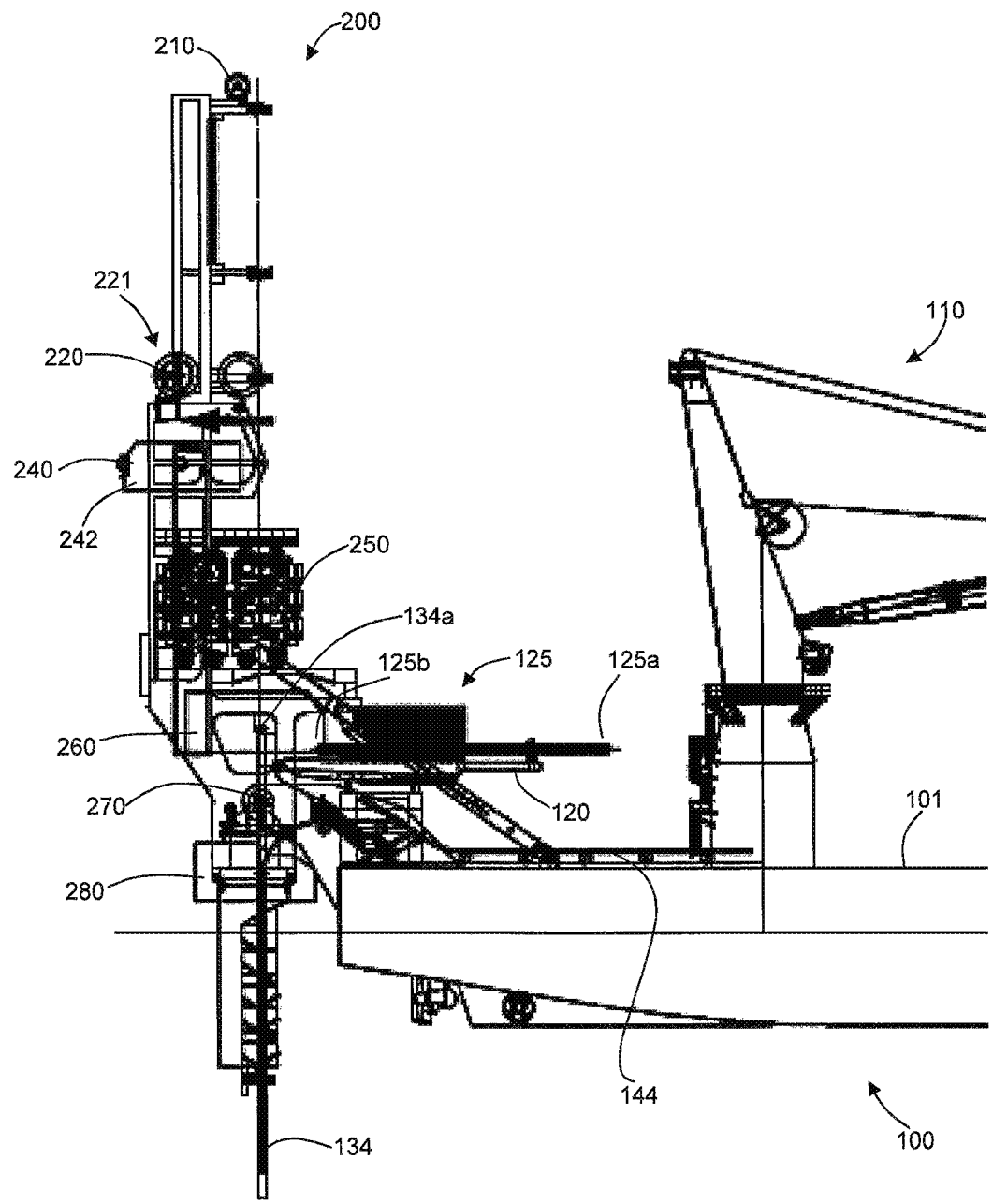
FIG. 3a shows a partial side view of the vessel during a first stage of a "bulky item" installation.
Figure 3B:
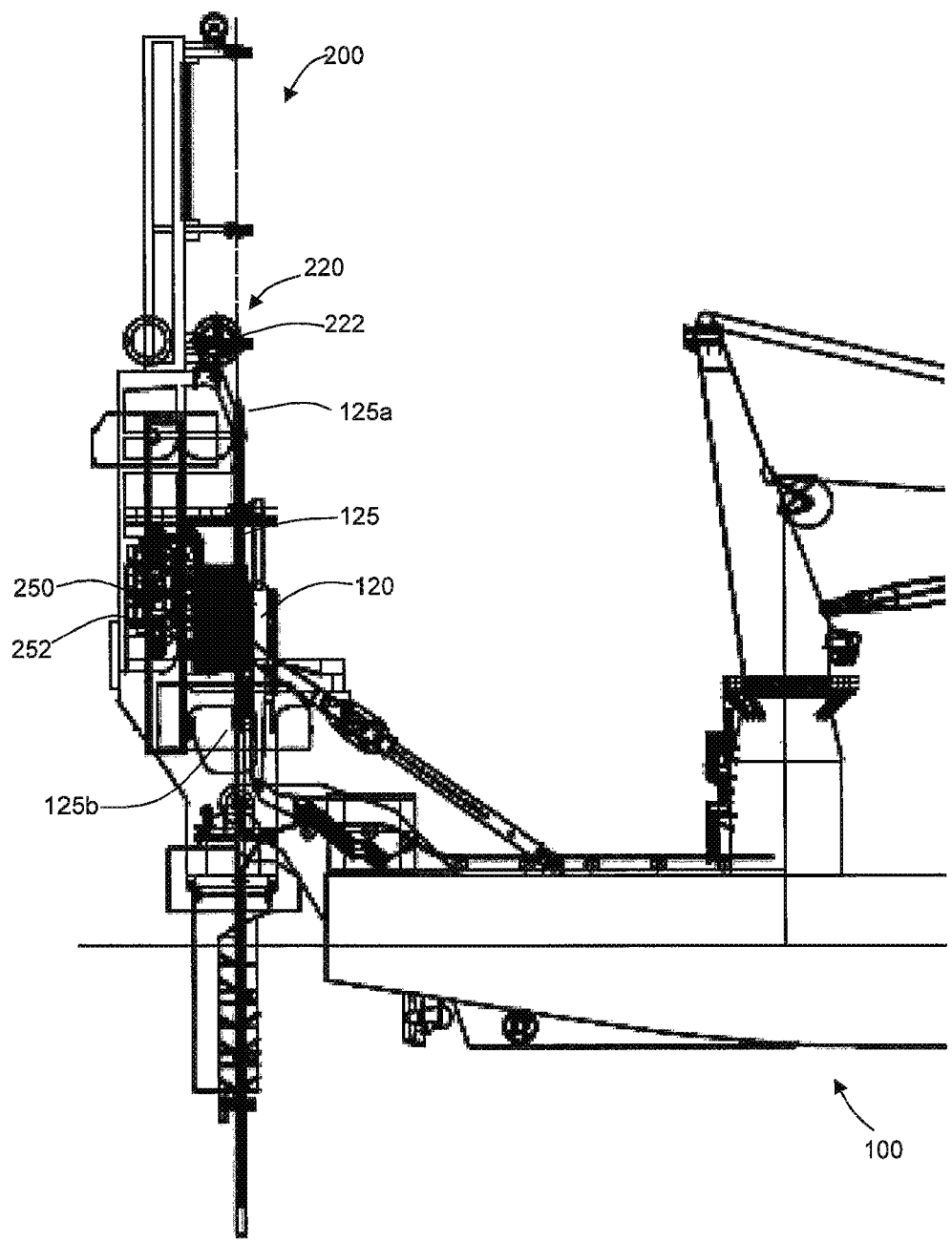
FIG. 3b shows a partial side view of the vessel during a second stage of a "bulky item" installation.
Figure 3C:
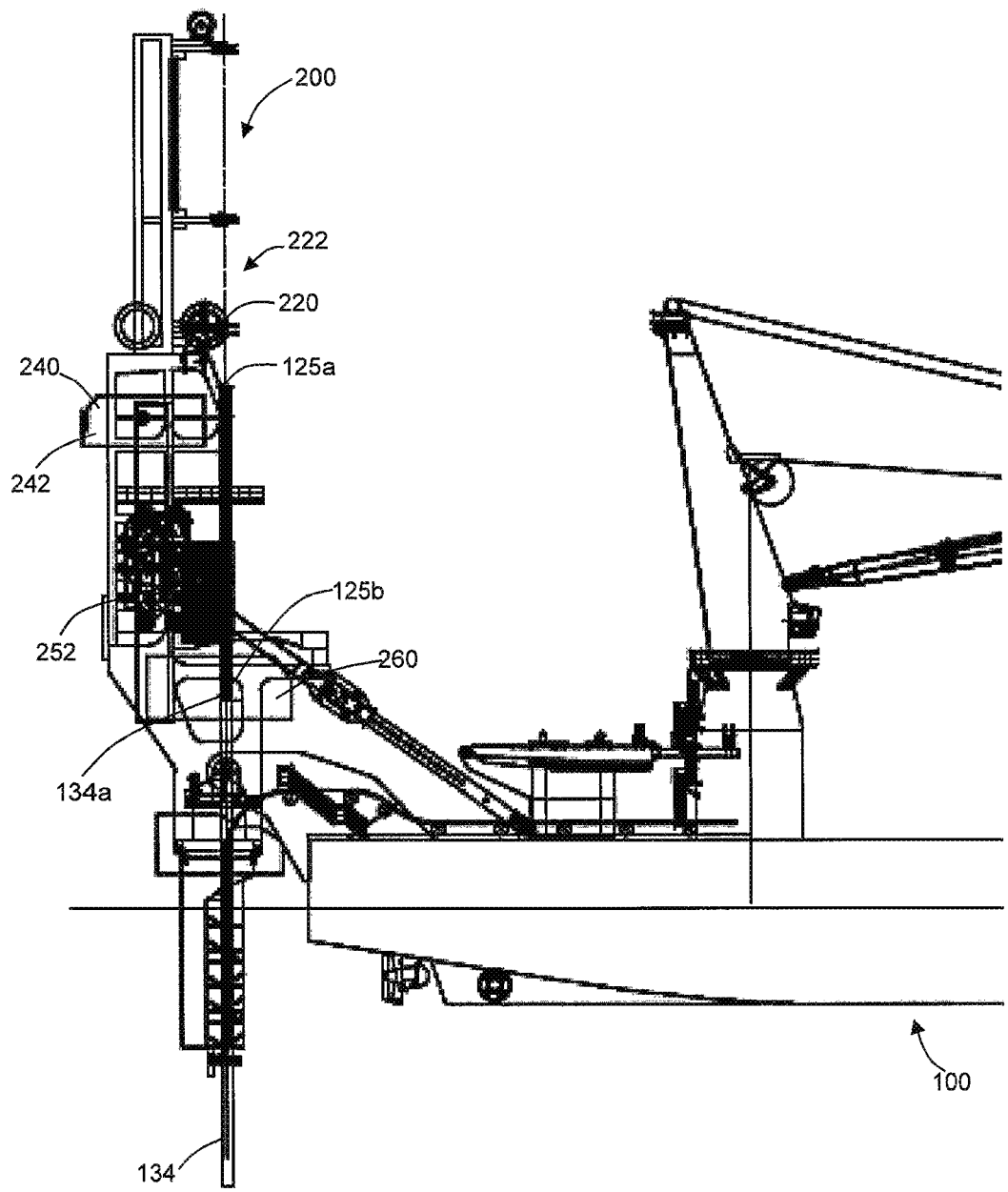
FIG. 3c shows a partial side view of the vessel during a third stage of a "bulky item" installation.

At the top of the truss section is an internal line-up clamp winch 210 which is associated with a corresponding internal line-up clamp (not shown in FIGS. 3*a* to 3*h*). Along the truss section 203 are three pipestring clamps 230, labelled as upper clamp 231, middle clamp 232 and lower clamp 233. These clamps 230 clamp a pipestring 136 while it is welded to the pipeline 134. The three pipestring clamps 231, 232, 233 are not required to hold the full tension of the pipeline and consequently have a relatively low load bearing capacity.

Where the truss section 203 joins to the main tower 200, at the top of this main section of the tower, is an abandonment and recovery sheave 220. The sheave has a first position 221 shown in FIG. 2 (and FIGS. 3*a*, 3*f* and 3*g*) in which it is aft of the firing line 133 of the pipestring/pipeline. It also has a second position 222 which is shown in FIGS. 3*b* and 3*c*, for example Slightly further down the tower 200, is a first workstation, in the form of a welding station 240. This is the station where the upper end 134*a* of the pipeline being laid is welded to the lower end 136*b* of the pipestring 136. The welding station 240 has a first position 241 shown in FIG. 2 in which it is in the firing line 133 of the pipestring/ pipeline. It also has a second position 242 which is shown in FIG. 3*a* for example.

Further down the tower 200 again, is a tensioner clamping arrangement 250. The tensioners 250 are used to lay the pipeline 134 and are the main means provided on the tower for clamping the pipeline in position when being worked on at the workstations and are also the main means for paying out the rigid pipeline whilst withstanding the pipeline tension caused by the weight of the pipeline being held by the vessel. The tensioners 250 have a first position 251 shown in FIG. 2 in which they are in the firing line 133 of the pipestring/pipeline. They also have a second position 252 which is discussed in relation to FIGS. 3*b* and 3*c*.

Again, going further down the tower 200 is a second workstation 260. This second station is used for coating the pipeline 134. It is also used to weld bulky items to the pipeline 134 as will be described in relation to FIGS. 3*a* to 3*h*.

At slightly above deck level 101, is a hang-off friction clamp 270, which is moveable between an open, released and closed, clamping position. During normal laying operations the main tensioners perform the laying cycle without the need for the hang-off clamp 270. The hang-off clamp 270 is used as a safety clamp to clamp the pipeline 134 when it is not being laid out, for example in case of emergency (e.g. in the case of there being a fault with the main tensioners) and also during special laying operations, for example when there is a need to manage the laying of bulky items.

Below the hang-off clamp 270, but above the stinger 204, is a third workstation 280. This workstation is a flexible product attaching station 280 and is use to attach the flexible product 144 to the pipeline 134 at regular intervals.

As a first step in the laying process, a pipestring 136 is raised from the stock 132 by loading arm 131, to a position parallel to the truss section 203 at the top of the tower 200. Here is it clamped by the three pipestring clamps 231, 232, 233 and the loading arm 131 lowered back down the tower.

Internal line-up clamp is placed inside the upper end 136*a* of the pipestring and lowered on a winch to the lower end 136*b* of the pipestring 136. The lower end 136*b* of the pipestring is then welded to the top 134*a* of the pipeline 134 in welding station 240, after the ends 136*b*, 134*a* have been lined up by the internal line-up clamp. The internal line-up clamp and associated winch 210 for holding and managing individual pipestrings are not required to hold the full tension of the pipeline and consequently have a relatively low load bearing capacity.

Once the pipestring 136 has been joined to the pipeline 134, the tensioners 250 are used to lay out the pipeline 134, including the newly welded pipestring 136. Once the upper end of the pipestring 136*a* (now the upper end of the pipeline 134*a*) reaches the welding station 240, a new pipestring is raised by the loading arm, ready to repeat the process again.

During the whole process, the second work station 260 is used to coat the newly welded joints of the pipeline 134 as the pipeline 134 is laid out past the workstation 260. Similarly, the third workstation 280 is used to attach flexible product to the pipeline 134 (using saddles every 6 metres, for example), as the pipeline 134 is laid out past the workstation 280, so as to lay out piggy-back product (i.e. the flexible product 144 piggybacking onto the rigid pipeline 134).

If the pipeline 134 needs to be abandoned at any point, this is done using the abandonment and recovery winch 220. Advantageously, when this is done, it is not necessary to also abandon the flexible product 144, and the connection with the vessel 100 of the flexible product 144 can be maintained. When abandoning piggyback product from the vessel, the tension of the rigid pipeline is held either by the hang-off clamp or the main tensioner. An A/R head is then attached to the free-end of the pipeline (or an internal pipe holding apparatus, able to take the full weight of the pipeline, is inserted) so that the A/R winch line may be attached. Tension is then taken up by the A/R winch line (with appropriate A/R tensioning means provided on the J-lay tower or otherwise on the vessel). Any clamping function provided by the clamping assemblies (tensioners or hang-off clamp) in the tower is released, with full tension in the rigid pipeline then being held by the A/R equipment. The flexible pipeline piggybacking on the rigid pipeline is not cut. As the A/R winch line pays-out, so that the free end of the rigid pipeline is lowered from the vessel 100 towards the sea-bed, the flexible product is also paid-out (at the same rate) using the reel/basket 141b/141a. The path taken by the flexible product as it leaves the vessel is thus different from that taken by the rigid pipeline. Before the free end of the rigid pipeline leaves the vessel, there is a direct connection between the rigid pipeline below the vessel 100 and the rigid pipeline held by the tower 200 of the vessel. After, the rigid pipeline is released from the vessel and then lowered via the A/R winch 220, that direct connection between pipeline and vessel no longer exists (and is effectively broken). There no longer exists a continuous length of rigid pipeline that extends from the vessel to the abandoned pipeline in the sea. However, a direct connection of the flexible conduit on the vessel 100 to the flexible conduit piggybacked on the rigid pipeline is retained during the abandonment process. The recovery of a piggyback pipeline product that has been previously abandoned as described above can be carried out effectively by performing the steps above in reverse. Thus, with the use of an A/R line (which may need to be attached as part of the recovery process, or may have remained attached since abandonment) the end of the rigid pipeline can be recovered back onto the vessel 100 and into the J-lay tower 200. At the same time as rigid pipeline is being recovered, the reel/basket 141b/141a is operated to reel-in the flexible conduit which is still connected. Once the free end of the rigid pipeline has been fully recovered into the J-lay tower 200, tension can be transferred from the A/R equipment to the tensioners 250 and welding of new pipestrings recommenced.

It can be seen at the bottom of FIG. 2 that a bulky item string 125 has been inserted in the pipeline 134. The bulky item string 125 comprises a pipestring 127 with a bulky item 126 on it. It has an upper end 125a and a lower end 125b. With reference to FIGS. 3a to 3h, the process of laying the bulky item string 125 as part of the pipeline 134 will be described.

FIG. 3a shows a partial side view of the vessel during a first stage of a "bulky item" installation. Here, the bulky item string 125 is on the bulky item handling skid 120. The bulky item string 125 is placed on the skid 120 by the crane 110. The skid 120 is then slid towards the tower, from its position in FIG. 2 to the position shown in FIG. 3a. During this first stage, the welding station 240 is moved from its first position 241 to a second position 242. In this second position 242, the welding station 240 is moved aft of the firing line 133. The pipeline 134 is being clamped by the hang-off clamp 270.

FIG. 3b shows a partial side view of the vessel during a second stage of a "bulky item" installation. Here, the skid 120 has been rotated so that the bulky item string 125 is parallel to the tower 200. In addition, the abandonment and recovery sheave 220 has been moved to its second position 222 on the firing line 133. Also, the tensioners 250 have moved to their second position 252 aft of the firing line 133.

FIG. 3c shows a partial side view of the vessel during a third stage of a "bulky item" installation. In this stage, the skid 120 had been used to adjust the position of the bulky item string 125, ready for welding to the pipeline 134. The welding is carried out in the second workstation (coating station) 260. Then, internal pipe clamp apparatus is inserted in the upper end of the pipestring 125a and takes the full weight of the pipestring 136. Further detail concerning this high-load capacity internal pipe clamp apparatus is provided with reference to FIGS. 4a to 4f below. The bulky item handling skid 120 is then lowered back to its original position as it is no longer needed to clamp the bulky item string 125.

Figure 3D:
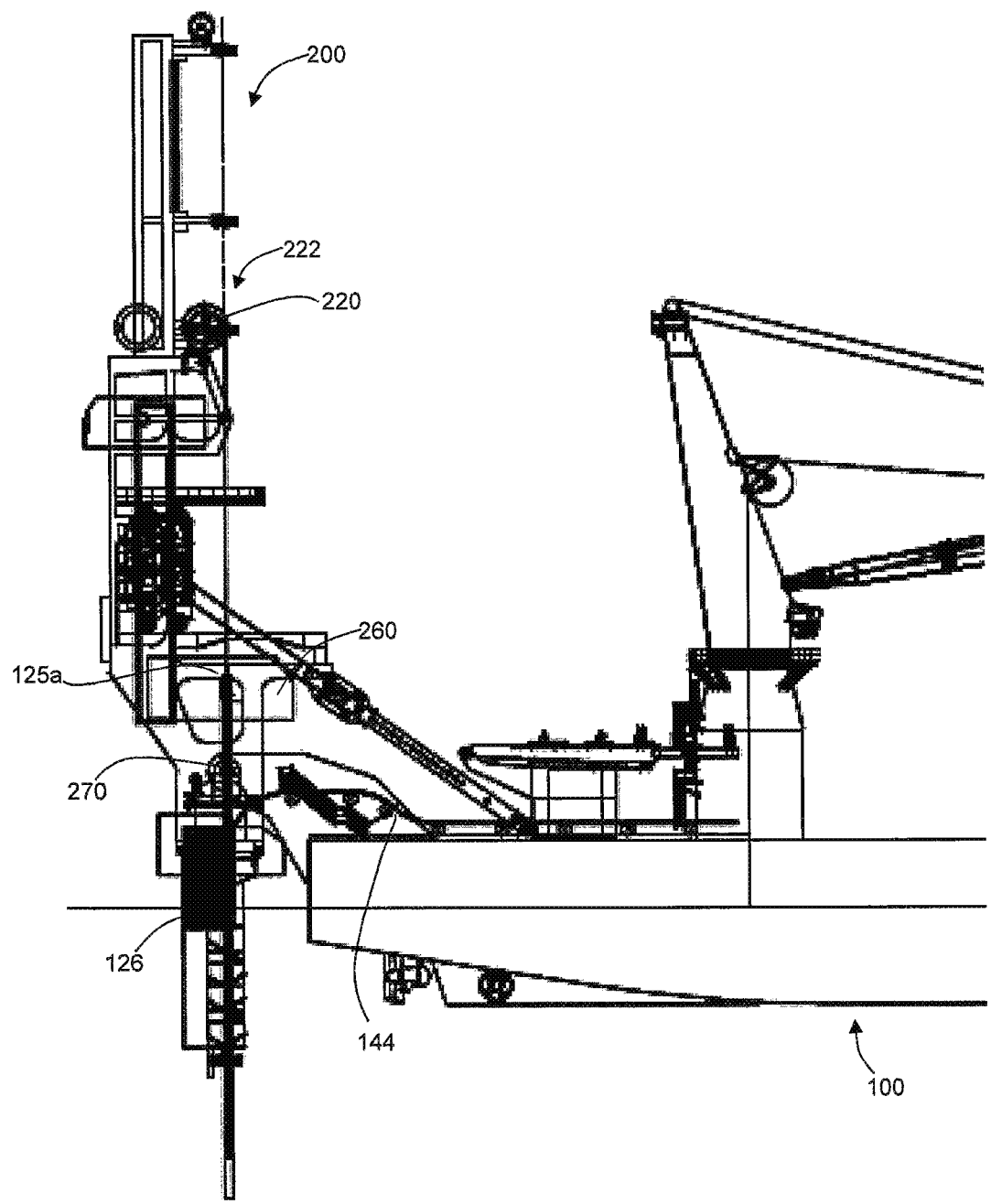
FIG. 3d shows a partial side view of the vessel during a fourth stage of a "bulky item" installation.

FIG. 3d shows a partial side view of the vessel during a fourth stage of a "bulky item" installation. Here, the hang-off clamp 270 has been opened. At this point, the internal pipe clamp apparatus takes the entire weight of the pipeline 134 (including and via newly joined bulky item string 125), via a line that is routed via the sheave 220. The line is paid-out via the sheave 220 thus lowering the pipeline 134 down so that the bulky item 126 is located below the hang-off clamp 270 and the upper end of the bulky item string 125a is located adjacent the coating station 260. At the same time, the flexible product 144 is unrolled from the basket/reel 141a/141b and attached in the normal manner so as to piggy-back on the rigid product.

Figure 3E:
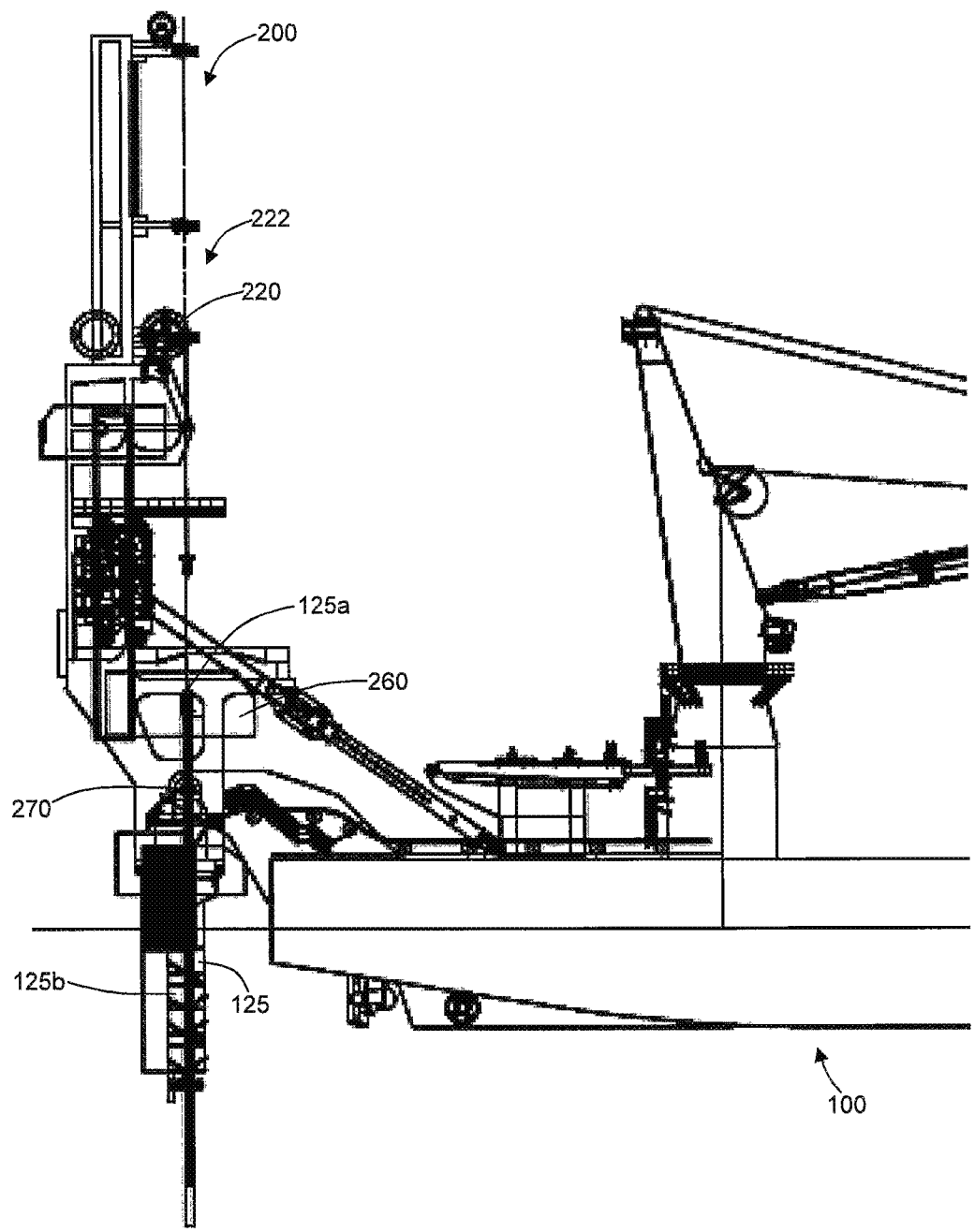
FIG. 3e shows a partial side view of the vessel during a fifth stage of a "bulky item" installation.

FIG. 3e shows a partial side view of the vessel during a fifth stage of a "bulky item" installation. Here, the hang-off clamp 270 has been closed around an upper region of the bulky item string 125. The internal pipe clamp apparatus is then disconnected from the bulky item string 125 and the abandonment and recovery sheave 220 retracted.

Figure 3F:
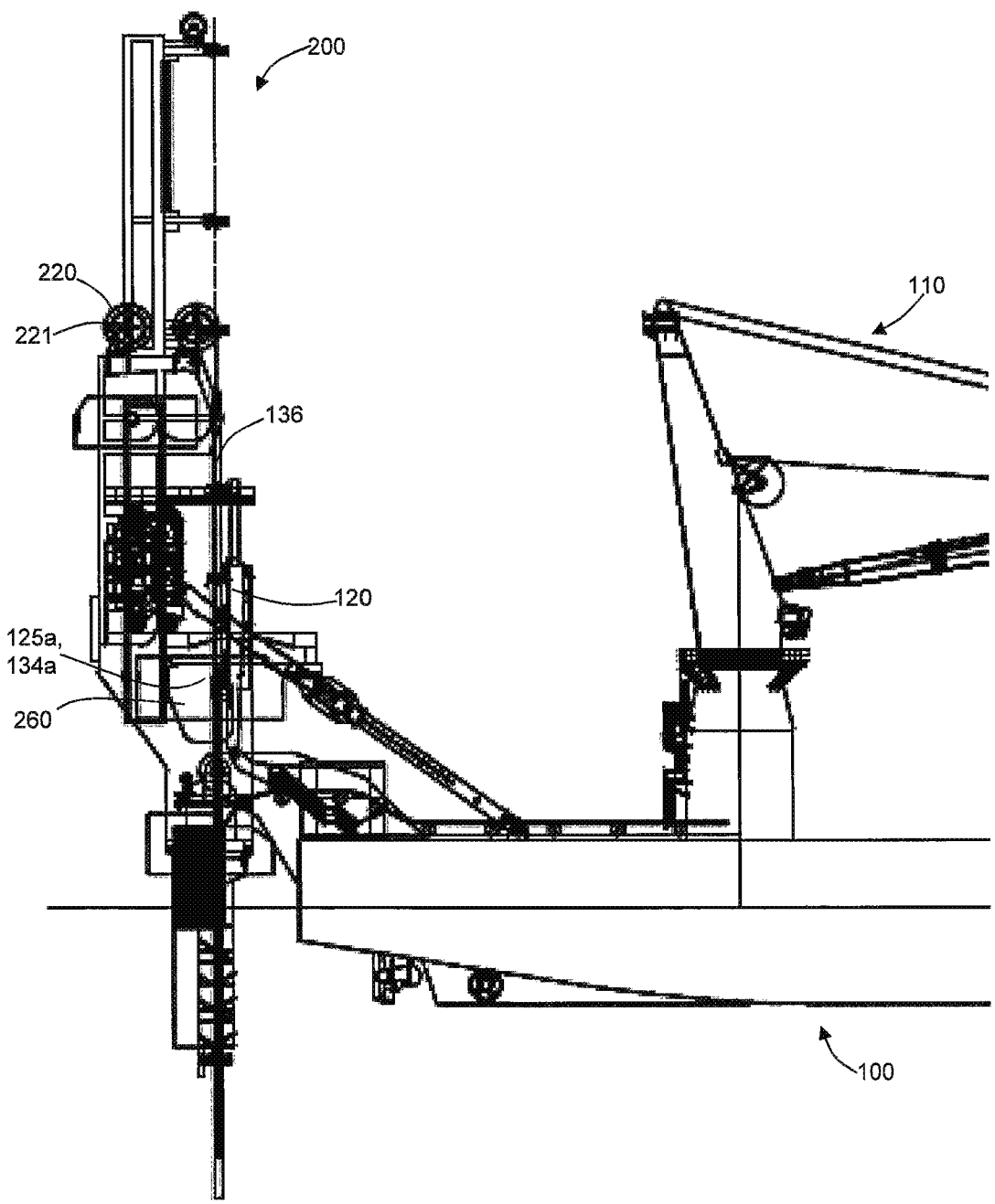
FIG. 3f shows a partial side view of the vessel during a sixth stage of a "bulky item" installation.

FIG. 3f shows a partial side view of the vessel during a sixth stage of a "bulky item" installation. Here, the abandonment and recovery sheave 220 has been moved back to its first position 221. In addition, the skid 120 has been loaded with a normal pipestring 136 using the crane 110, and has then been rotated to be parallel to the tower 200. The skid 120 is adjusted to line up the pipestring 136 with the upper end of the pipeline 134a (also the upper end of the bulky item string 125a). Welding of the new pipestring 136 and the pipeline 134 takes place in coating station 260.

Figure 3G:
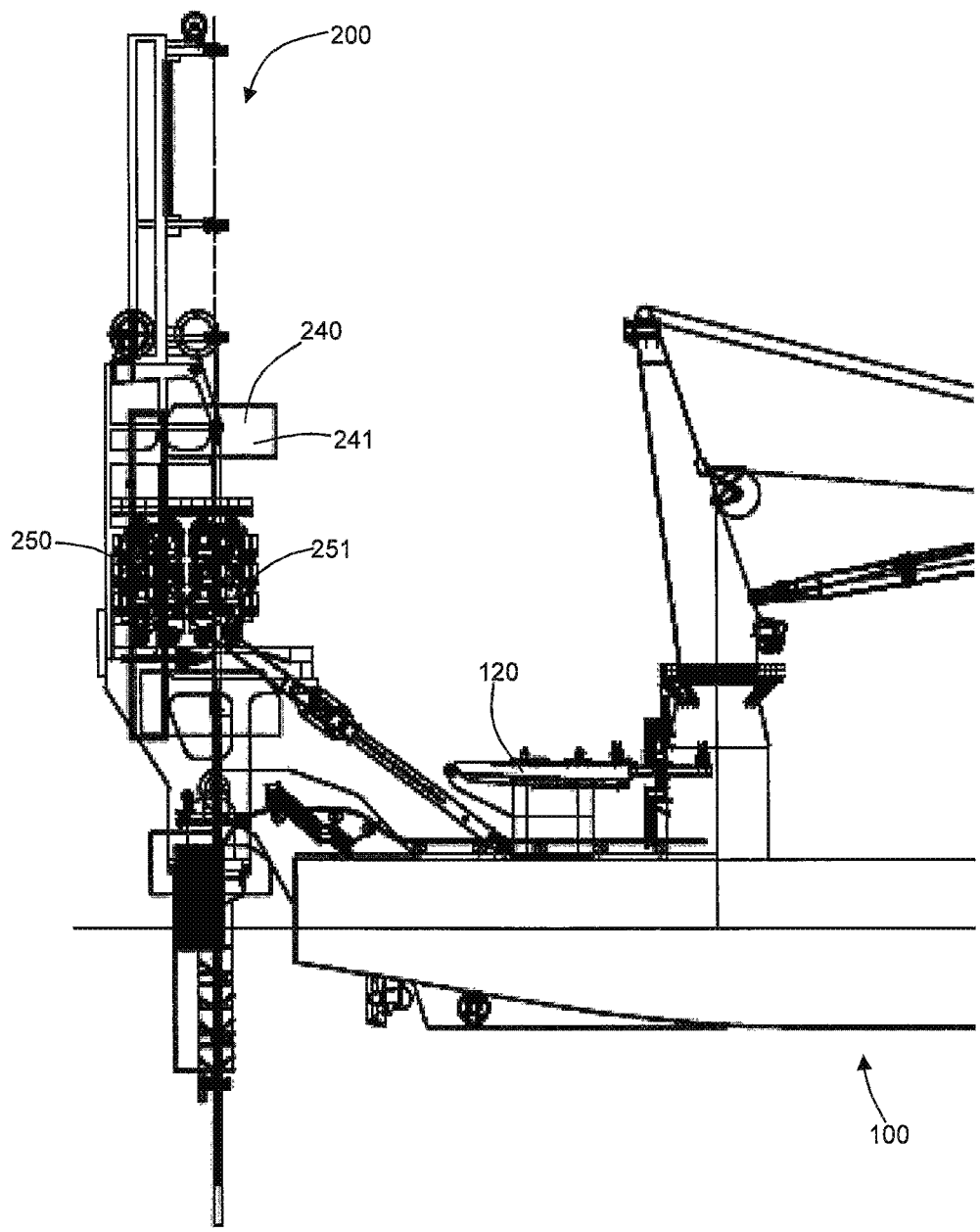
FIG. 3g shows a partial side view of the vessel during a seventh stage of a "bulky item" installation.
Figure 3H:
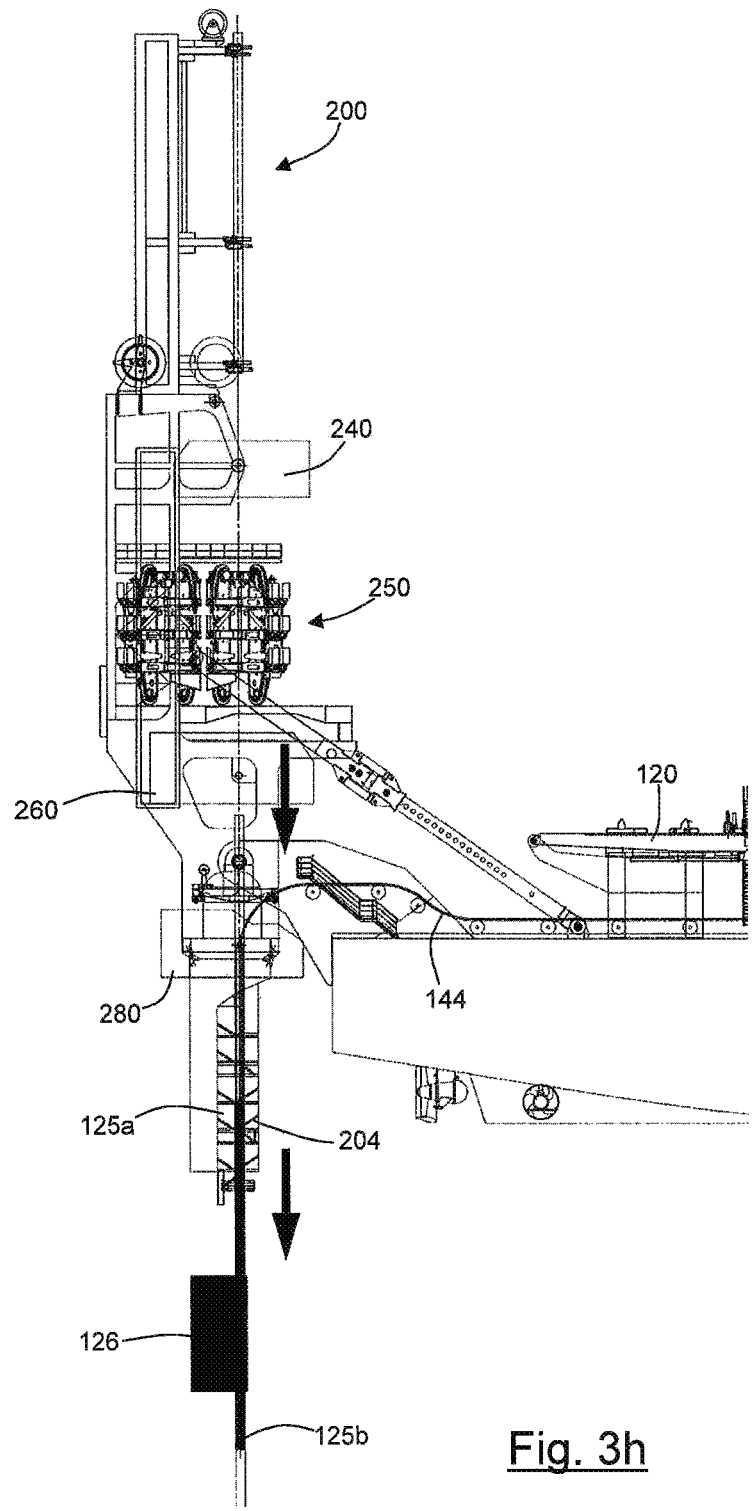
FIG. 3h shows a partial side view of the vessel during a seventh stage of a "bulky item" installation.

FIG. 3g shows a partial side view of the vessel during a seventh stage of a "bulky item" installation. Here, the welding station 240 is moved back to its first position 241. The tensioners 250 have also moved back to their first position 251 and the bulky item skid 120 has been lowered. The normal laying process can then continue. FIG. 3h shows the bulky item 126 being lowered further It will be noted that the view shown in FIG. 3h corresponds broadly to that shown in FIG. 2, but that FIG. 3h shows parts only of the vessel.

Figure 4A:
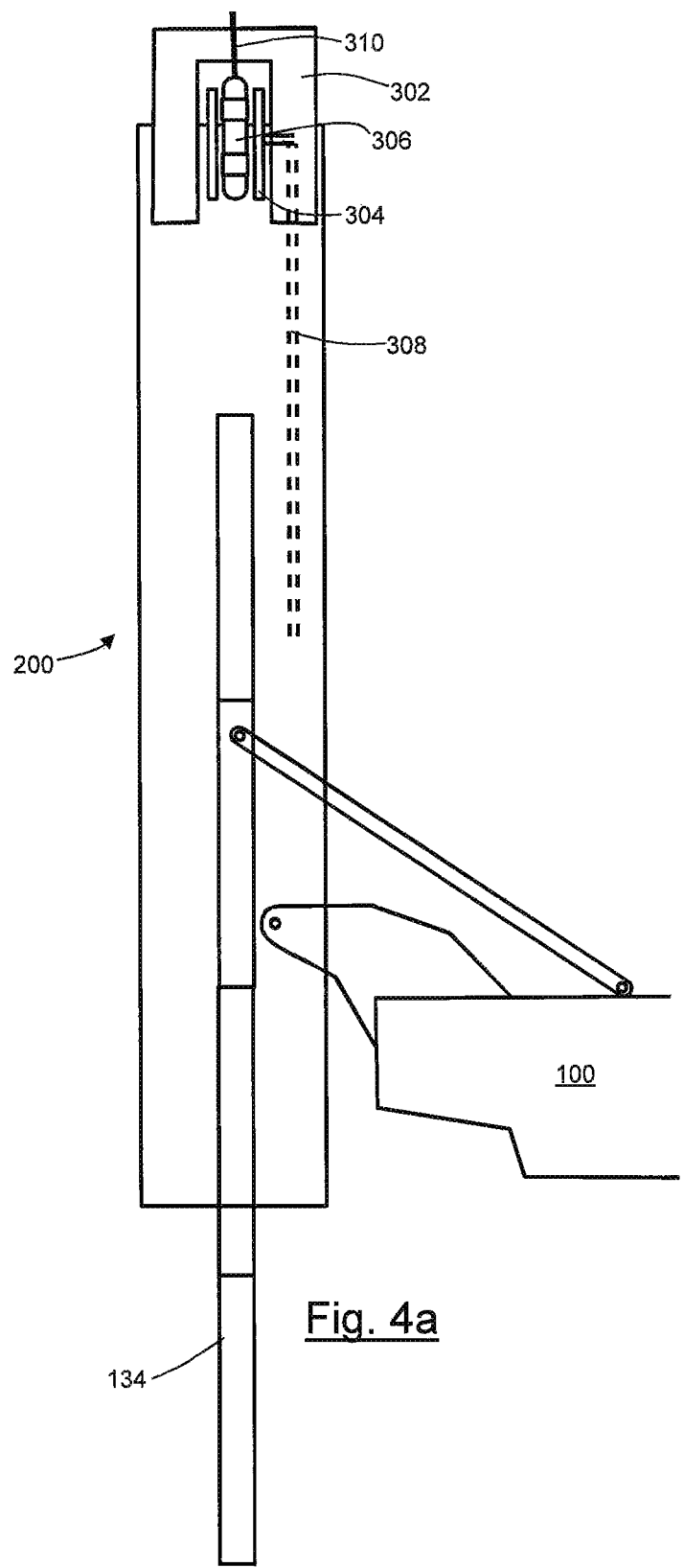
FIGS. 4a to 4f show schematic side views of the tower illustrating various stages of operation using an internal pipe tool in the tower.
Figure 4B:
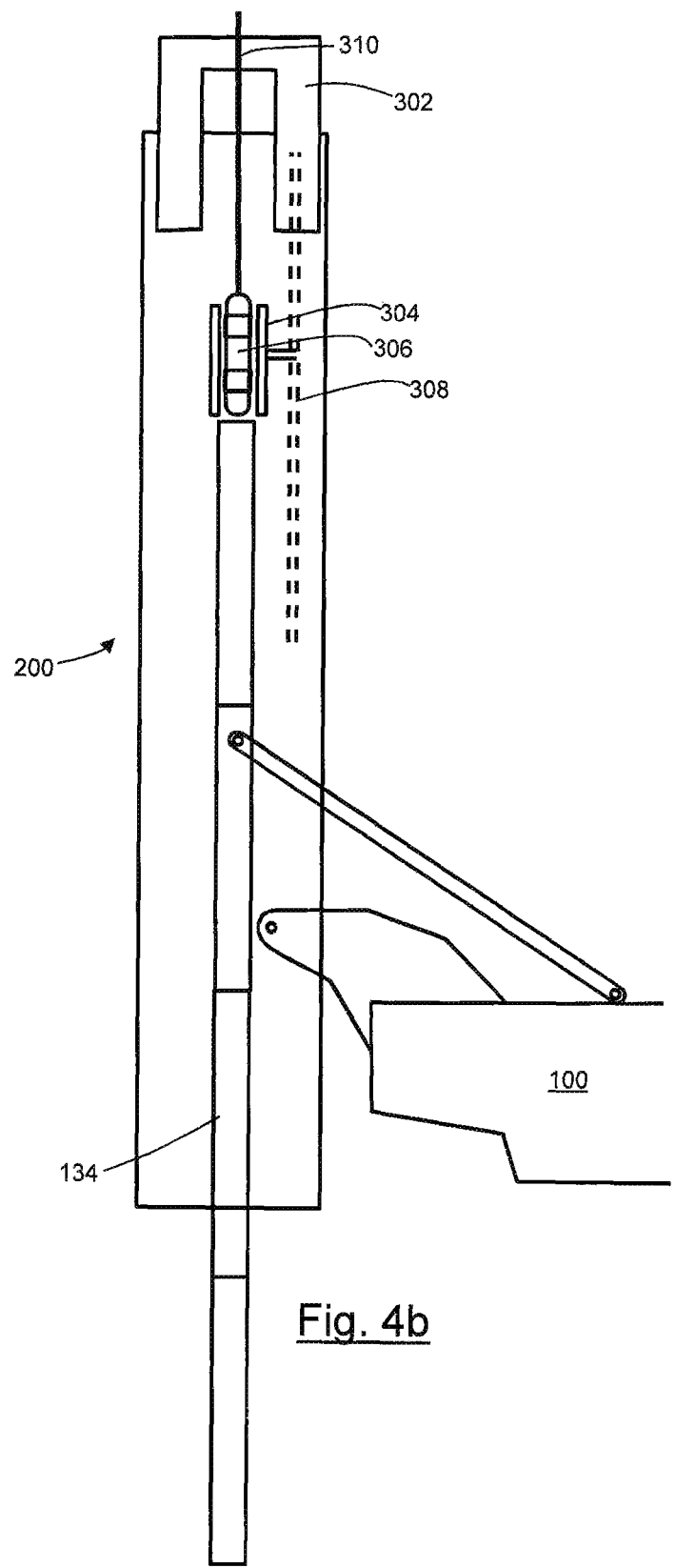
Figure 4C:
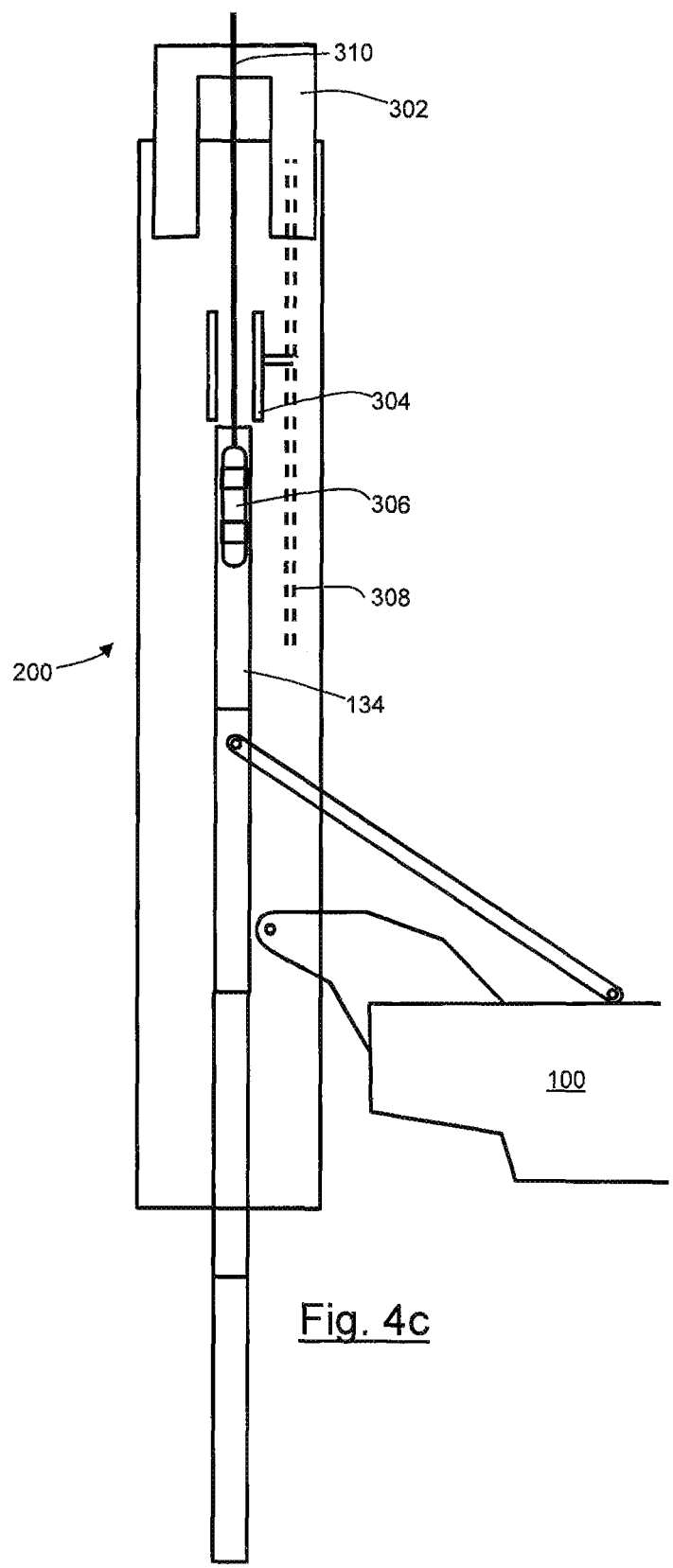

Above, mention is made of internal pipe clamp apparatus which is used to hold the full weight of the pipeline when managing a bulky item. FIG. 4a shows highly schematically the internal pipe clamp apparatus, which comprises an internal pipe lifting tool 306 suspended on a (detachable) line 310 (e.g. an A/R line) and is housed in the tower 200 in a garage 302. FIG. 4a shows the tower arranged at a 90 degree to the horizontal configuration. The garage 302 is fixed to the tower, and is used to store the internal pipe lifting tool 306 when not in use. A guide apparatus comprising trolley 304 and guide rails 308 is also provided for guiding the lifting tool 306 from the garage 302 to the end of the rigid pipeline 134 in the tower. FIG. 4b shows the trolley 304 carrying the pipe lifting tool 306 from the garage towards the free end of the pipeline 134. When the trolley is next to and aligned with the pipeline (as shown in FIG. 4b) the trolley 304 releases the pipe lifting tool 306, so that the pipe lifting tool 306 is suspended and held by the line 310. The line is lowered so that the pipe lifting tool 306 moves from within the trolley to the interior of the pipe (to a position like that shown in FIG. 4c), its passage being guided in part by the trolley and in part from the interior walls of the pipeline 134. Once fully received within the pipeline, clamps of the pipe lifting tool 306 may operate to clamp the pipeline so that the weight of the pipeline can be transferred to the line 310.

Figure 4D:
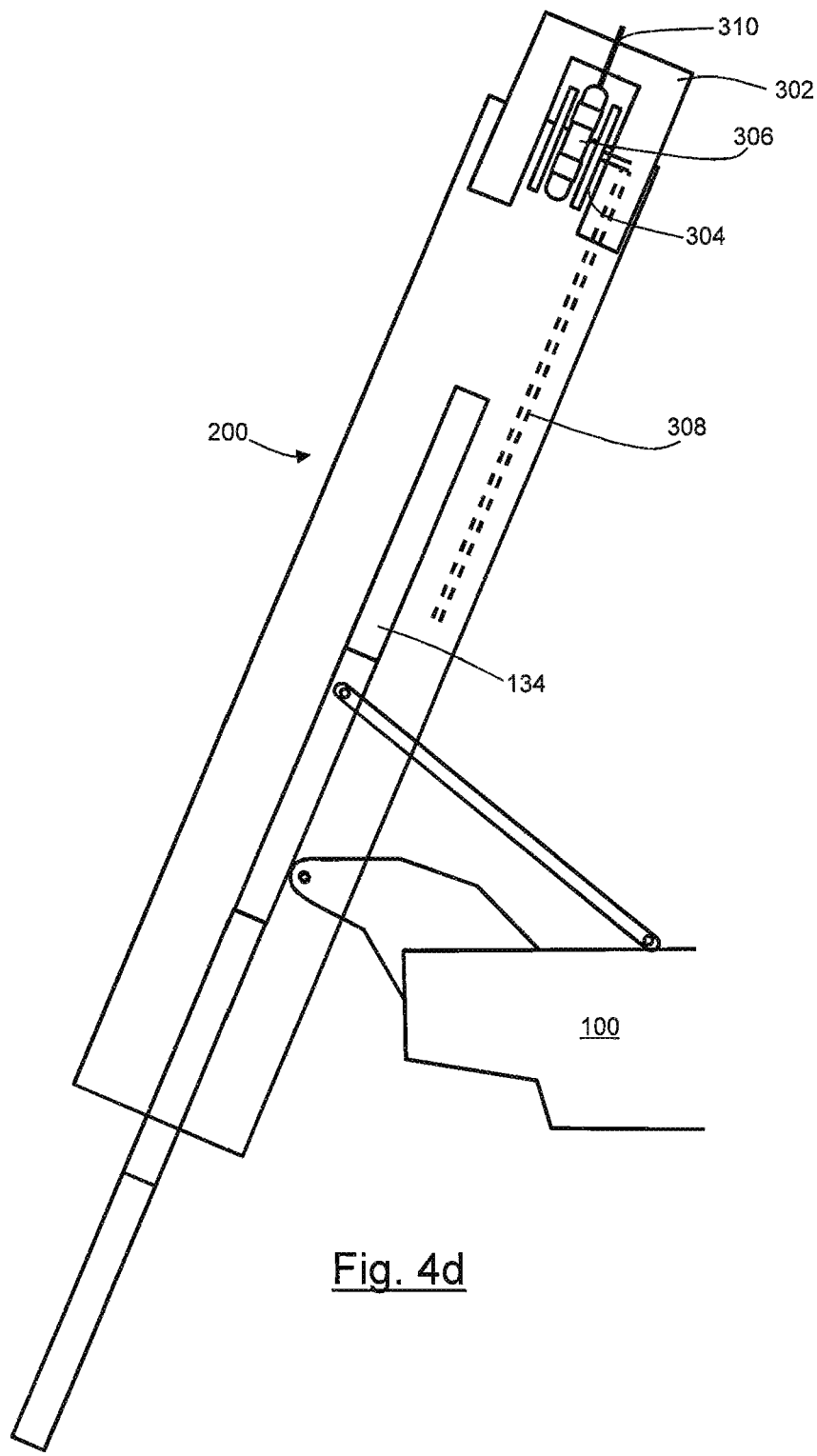
Figure 4E:
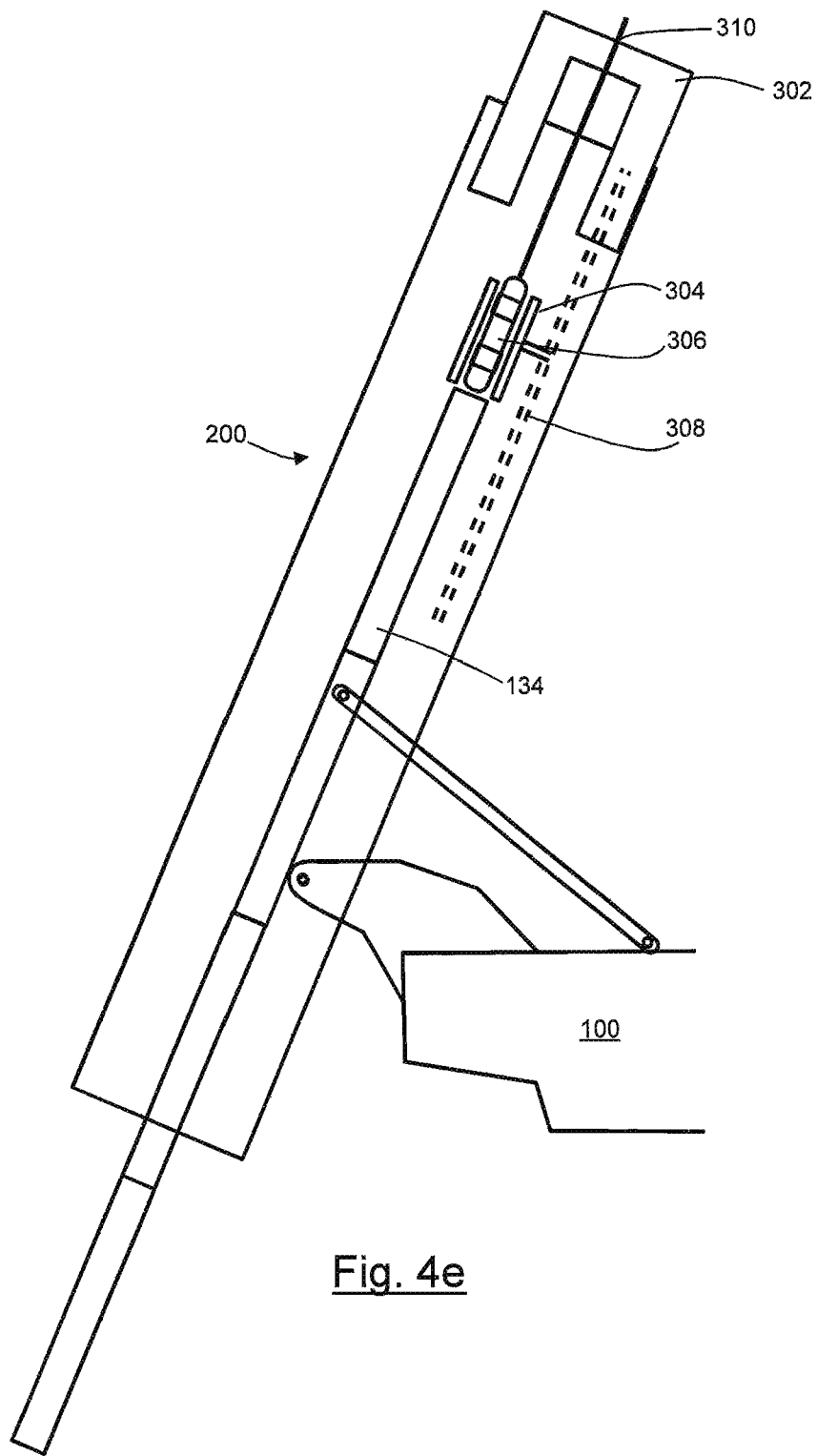
Figure 4F:
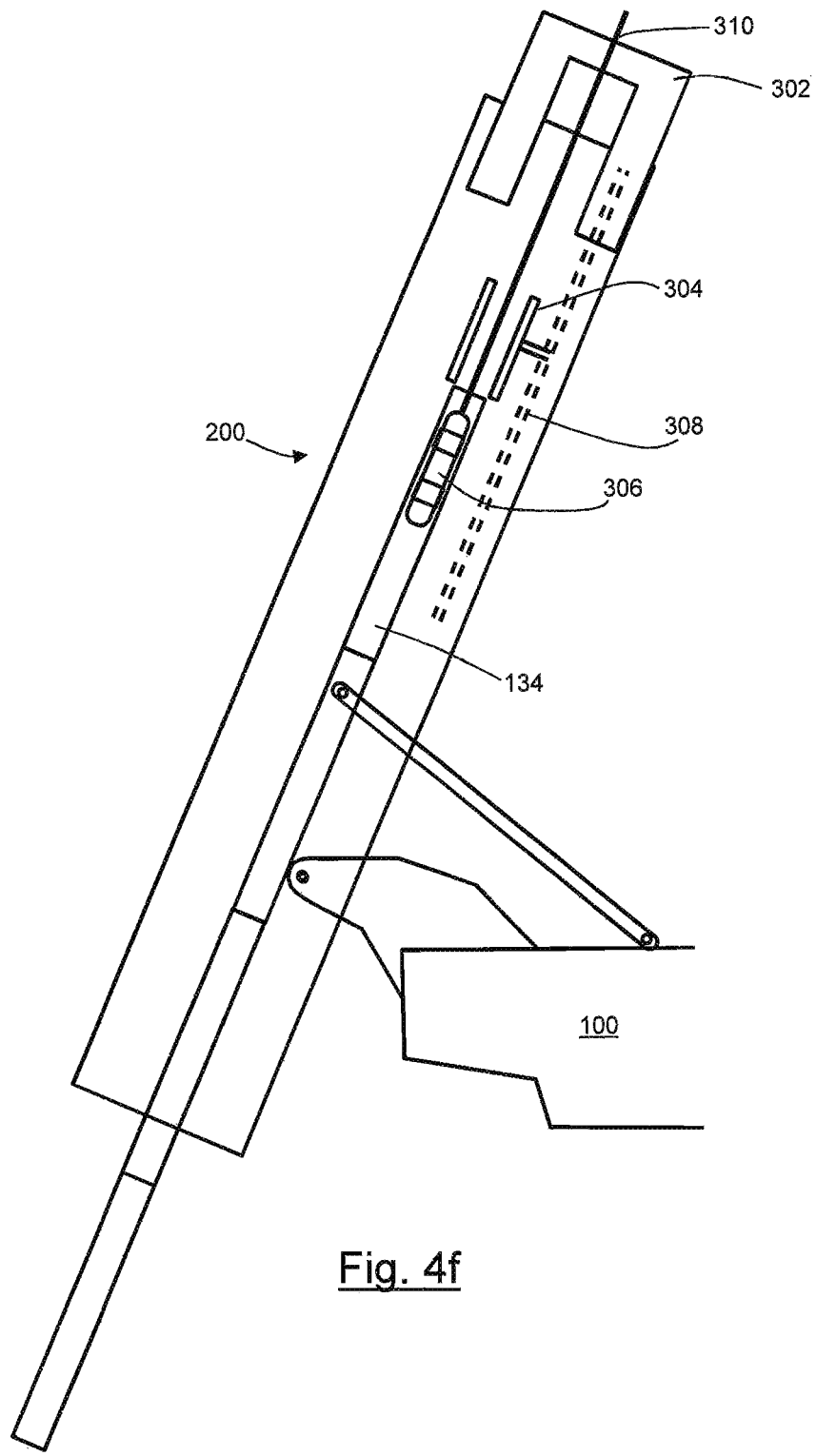

FIG. 4*d* shows the tower tilted at an angle of about 67 degrees to the horizontal. When the tower is so tilted the garage 302, trolley 304 and guide rails 308 also tilt with the tower 200 to adopt the same relative angle. Whilst not shown in FIGS. 4*a* to 4*f*, the workstations positioned along the length of the tower also rotate relative to the tower, in dependence on the tilting of the tower, so that the working floor/platform of each workstation is maintained level with the horizontal/vessel. FIG. 4*e* shows the trolley 304 carrying the pipe lifting tool 306 from the garage towards the free end of the pipeline 134. When the trolley 304 is next to and aligned with the pipeline (as shown in FIG. 4*e*) the trolley 304 releases the pipe lifting tool 306, so that the pipe lifting tool 306 is suspended and held by the line 310. The line is lowered so that the pipe lifting tool 306 moves from within the trolley to the interior of the pipe (to a position like that shown in FIG. 4*f*), its passage being guided in part by the trolley and in part from the interior walls of the pipeline 134. Once fully received within the pipeline, clamps of the pipe lifting tool 306 may operate to clamp the pipeline so that the weight of the pipeline can be transferred to the line 310. By controlling the orientation of the pipe lifting tool 306 in this manner, correct alignment with the end of the pipeline can be repeatedly and readily achieved at any angle of tilting of the J-lay tower.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

As an alternative, the vessel may be provided with two chutes or reels/baskets for laying two different flexible products with the rigid pipeline. For example, there may be one chute (and associated firing line) on one side of the tower and a second chute (and associated firing line) on the other side of the tower.

As another alternative, the tensioners may be mounted on the tower such that there is a "dead-band" of movement of roughly between 0.5 to 1 metre or +−5 tonnes. This allows for the pipeline to move up and down relative to the tower to allow for movement of the vessel. This puts less stress (tension) on the pipeline being laid. For this to work, it would be expected to have pipe joint processing apparatus (e.g. welding apparatus) clamped to the pipeline itself and so move with the pipeline and the site to be welded, rather than with the vessel.

As another alternative, a friction clamp assembly or a collar clamp assembly could be used in place of the tensioners.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A pipe-laying vessel including a pipe-laying tower extending upwardly from the vessel, the vessel comprising:
   at least two clamping assemblies for clamping a pipeline, the clamping assemblies being mounted along the length of the tower, and
   at least one workstation mounted on the tower, wherein the workstation is mounted on the tower below a lowermost clamping assembly,
   wherein the lowermost clamping assembly comprises a hang-off clamp; wherein a the lowermost workstation is configured to attach a flexible conduit alongside the pipeline.

2. The pipe-laying vessel as claimed in claim 1, wherein the lowermost clamping assembly is at or above deck level of the vessel.

3. The pipe-laying vessel as claimed in claim 1, the vessel comprising at least three separate workstations spaced apart along the length of the tower.

4. The pipe-laying vessel as claimed in claim 1, wherein an uppermost workstation is mounted on the tower above an uppermost clamping assembly.

5. The pipe-laying vessel as claimed in claim 4, wherein the uppermost workstation is configured to weld a lower end of a pipestring to an upper end of the pipeline.

6. The pipe-laying vessel as claimed in claim 4, wherein the uppermost clamping assembly comprises a pipeline clamp or tensioner arrangement.

7. The pipe-laying vessel as claimed in claim 1, wherein an intermediate workstation is mounted on the tower in between the two clamping assemblies.

8. The pipe-laying vessel as claimed in claim 7, wherein the intermediate workstation is configured to perform pipeline coating operations.

9. A method of J-laying a pipeline from the vessel according to claim 1, the method including:
   passing a rigid pipeline down a length of a J-lay tower; and
   attaching a flexible conduit alongside the pipeline with the workstation that is configured to attach the flexible conduit alongside the rigid pipeline.

10. A pipe-laying vessel including a pipe-laying tower extending upwardly from the vessel, the vessel comprising:
    at least two clamping assemblies for clamping a pipeline, the clamping assemblies being mounted along the length of the tower, and
    at least one workstation mounted on the tower, wherein the workstation is mounted on the tower below a lowermost clamping assembly,
    wherein the workstation below the lowermost clamping assembly is configured to attach a flexible conduit alongside the pipeline.

11. The pipe-laying vessel as claimed in claim 10, wherein the lowermost clamping assembly is at or above deck level of the vessel.

12. The pipe-laying vessel as claimed in claim 10, the vessel comprising at least three separate workstations spaced apart along the length of the tower.

13. The pipe-laying vessel as claimed in claim 10, wherein an uppermost workstation is mounted on the tower above an uppermost clamping assembly.

14. The pipe-laying vessel as claimed in claim 13, wherein the uppermost workstation is configured to weld a lower end of a pipestring to an upper end of the pipeline.

15. The pipe-laying vessel as claimed in claim 13, wherein the uppermost clamping assembly comprises a pipeline clamp or tensioner arrangement.

16. The pipe-laying vessel as claimed in claim 10, wherein an intermediate workstation is mounted on the tower in between the two clamping assemblies.

17. The pipe-laying vessel as claimed in claim 14, wherein the intermediate workstation is configured to perform pipeline coating operations.

18. The pipe-laying vessel as claimed in claim 10, wherein the lowermost workstation is thus capable of attaching a flexible conduit alongside the pipeline and enabling piggyback pipe-laying operation of the pipeline and the flexible conduit.

19. The pipe-laying vessel as claimed in claim 10, wherein the lowermost workstation is a flexible product attaching station capable of attaching a flexible conduit alongside the pipeline.

20. The pipe-laying vessel as claimed in claim 10, wherein the lowermost workstation is thus capable of attaching a flexible conduit alongside the pipeline and enabling the flexible conduit to be layed out simultaneously with the pipeline.

21. A method of J-laying a pipeline from the vessel according to claim 10, the method including:

passing a rigid pipeline down a length of a J-lay tower; and attaching a flexible conduit alongside the pipeline with the workstation that is configured to attach the flexible conduit alongside the rigid pipeline.

22. The method of J-laying a pipeline from a vessel, as claimed in claim 21, wherein the lowermost clamping assembly is at or above deck level of the vessel.

23. The method of J-laying a pipeline from a vessel, as claimed in claim 21, wherein the lowermost clamping assembly comprises a hang-off clamp.

24. A method of J-laying a pipeline from a vessel, the method including:

passing a rigid pipeline down a length of a J-lay tower extending upwardly from the vessel, the vessel comprising at least two clamping assemblies for clamping a pipeline, the clamping assemblies being mounted along the length of the tower, wherein the J-lay tower includes a workstation mounted on the tower below a lowermost clamping assembly; and attaching a flexible conduit alongside the pipeline with the workstation that is configured to attach the flexible conduit alongside the rigid pipeline.

25. The method of J-laying a pipeline from a vessel, as claimed in claim 24, wherein the lowermost clamping assembly is at or above deck level of the vessel.

26. The method of J-laying a pipeline from a vessel, as claimed in claim 24, wherein the lowermost clamping assembly comprises a hang-off clamp.

27. A method of J-laying a pipeline from a vessel, the method including:

passing a rigid pipeline down a length of a J-lay tower extending upwardly from the vessel, the vessel comprising at least two clamping assemblies for clamping a pipeline, the clamping assemblies being mounted along a length of the tower, wherein a lowermost one of the at least two clamping assemblies comprises a hang-off clamp; and wherein the J-lay tower includes a workstation mounted on the tower below the hang-off clamp; and attaching a flexible conduit alongside the pipeline with the workstation that is configured to attach the flexible conduit alongside the rigid pipeline.

28. The method of J-laying a pipeline from a vessel, as claimed in claim 27, wherein the lowermost clamping assembly is at or above deck level of the vessel.

29. The method of J-laying a pipeline from a vessel, as claimed in claim 27, wherein the lowermost clamping assembly is at or above deck level of the vessel.

\* \* \* \* \*